Jan. 4, 1944. R. K. LE BLOND ET AL 2,338,121
MILLING MACHINE TRANSMISSION AND CONTROL MECHANISM
Filed Oct. 14, 1941 19 Sheets-Sheet 19
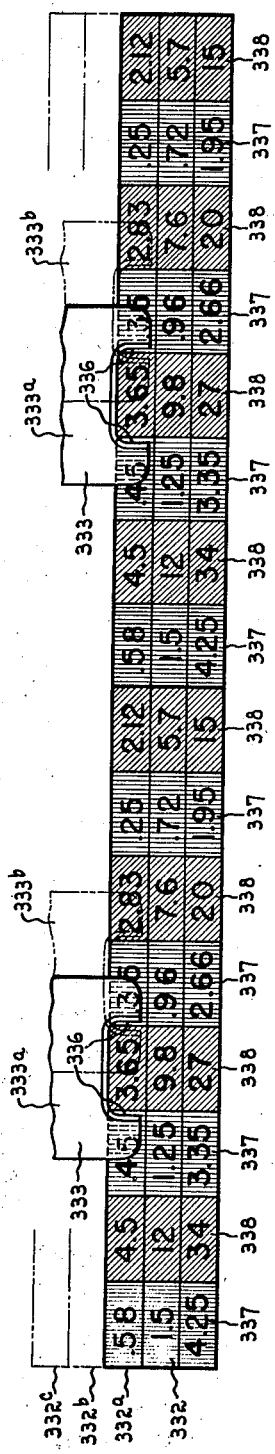
FIG. XXI
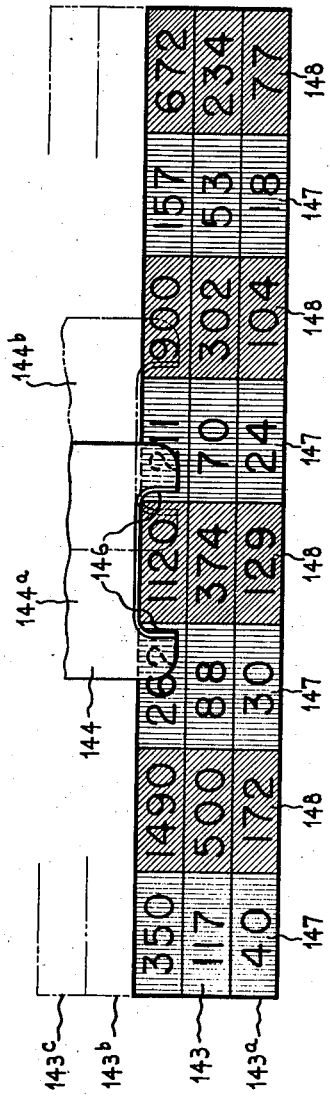
FIG. XXII
INVENTORS.
RICHARD K. LeBLOND
HARRY C. KEMPER
BY Willard S. Groene

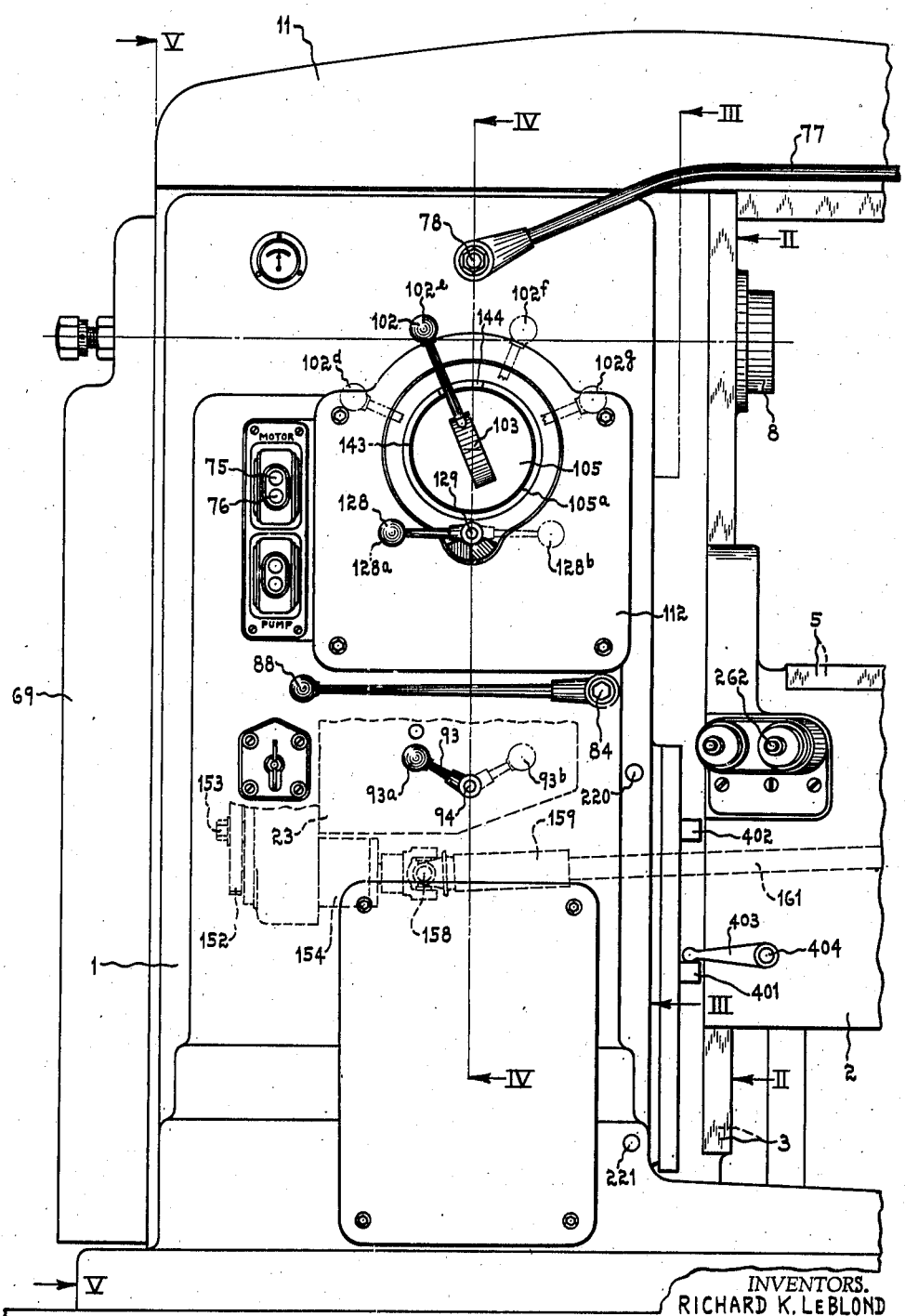
FIG. I

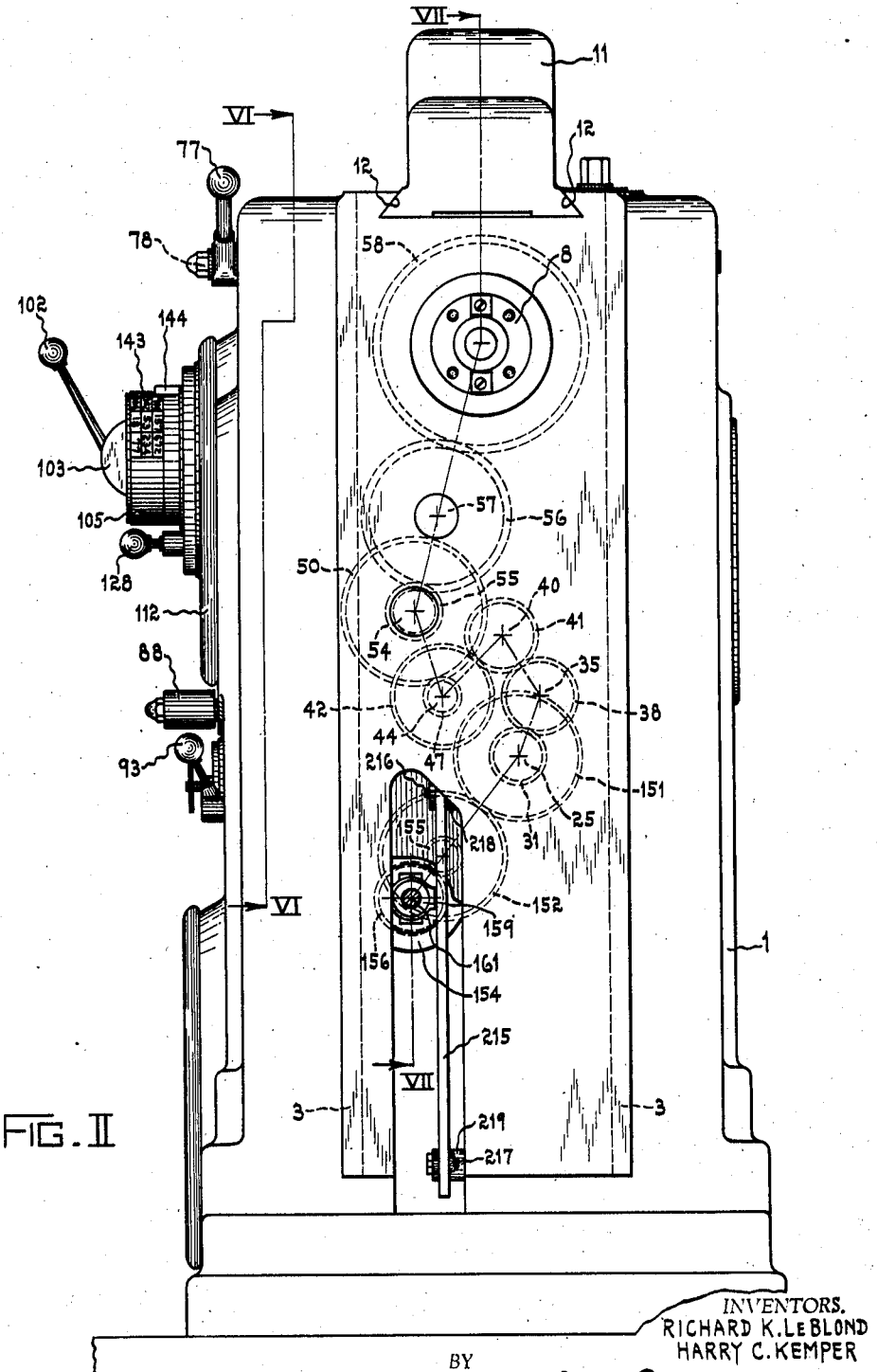
FIG. II

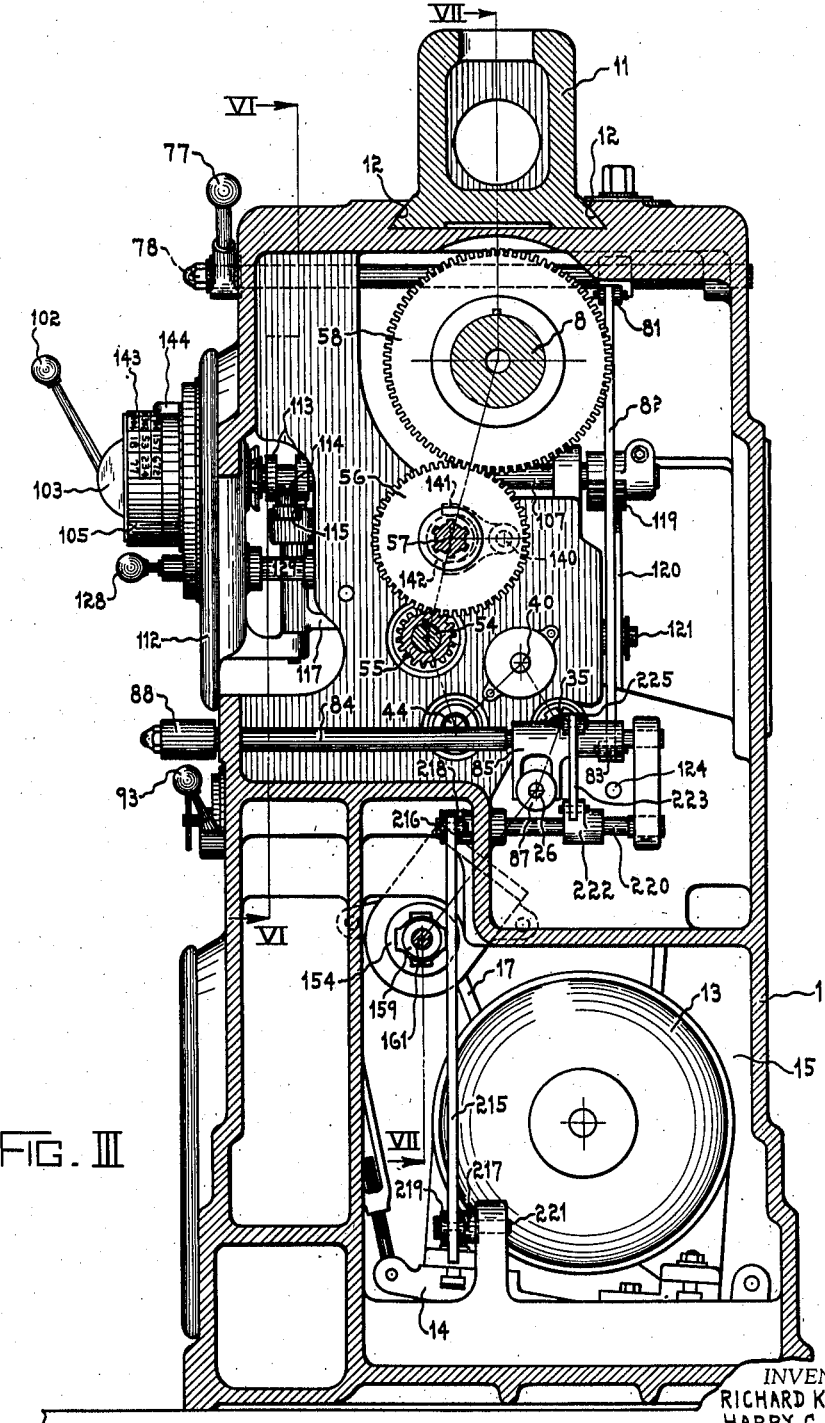
FIG. III

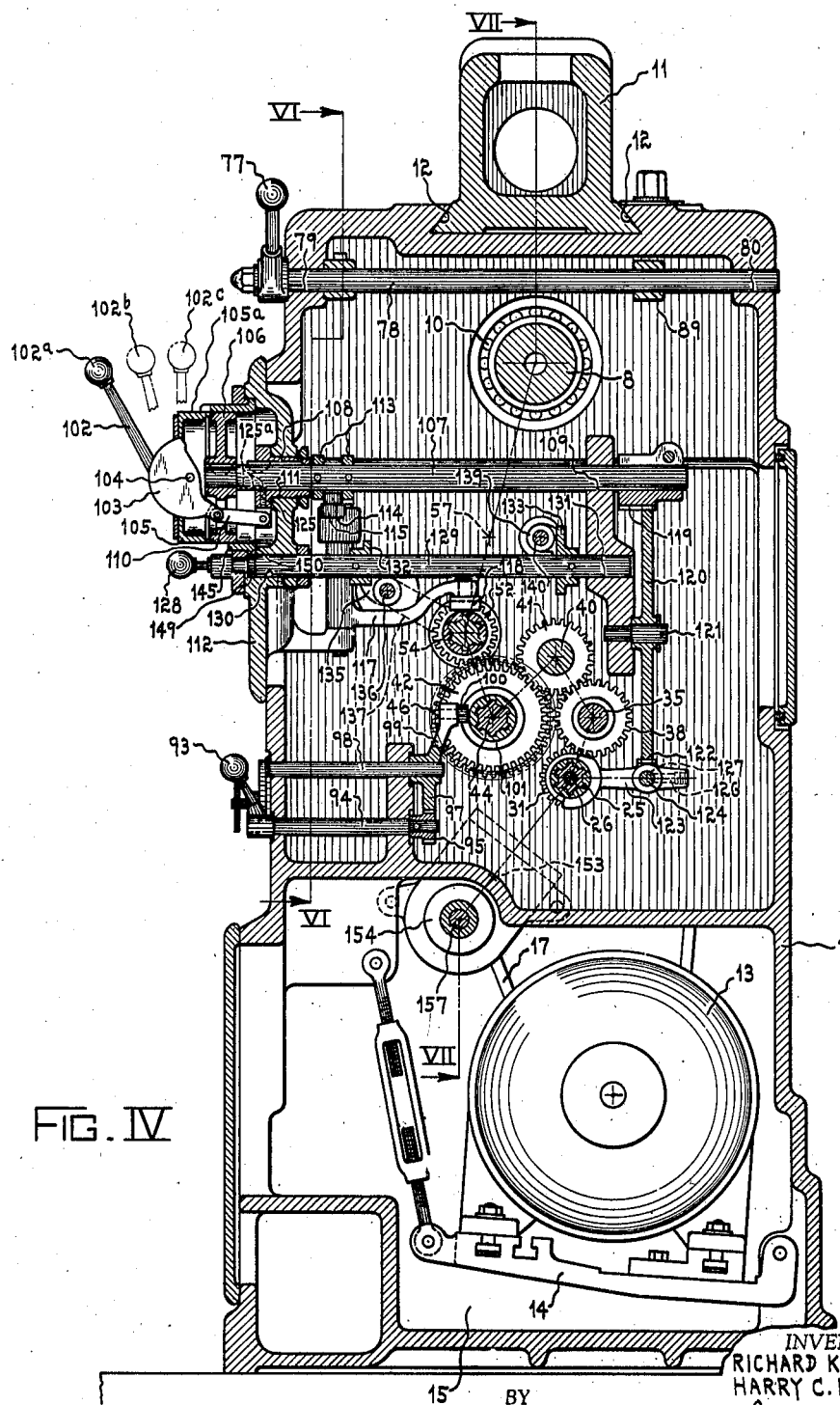

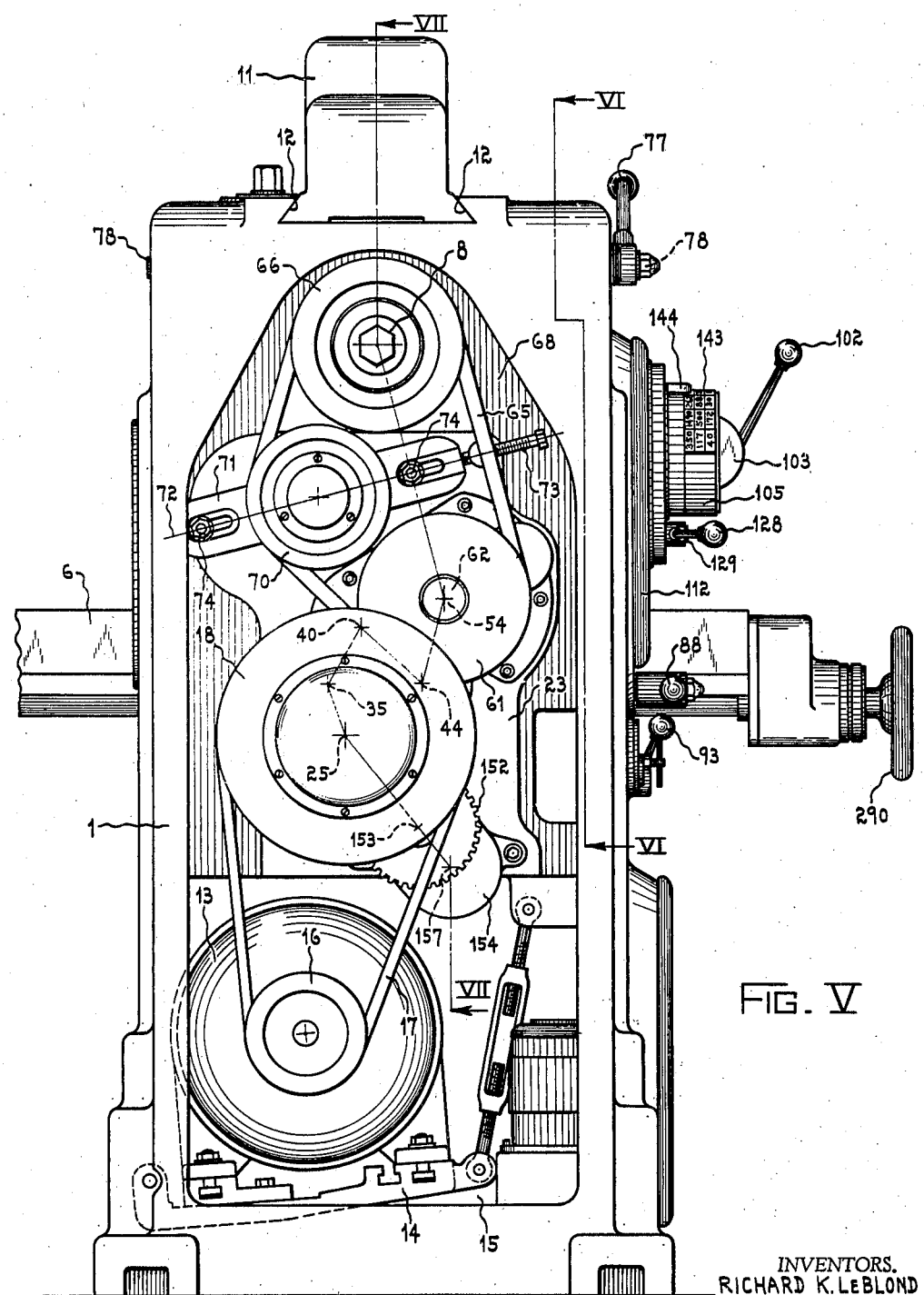
FIG. V

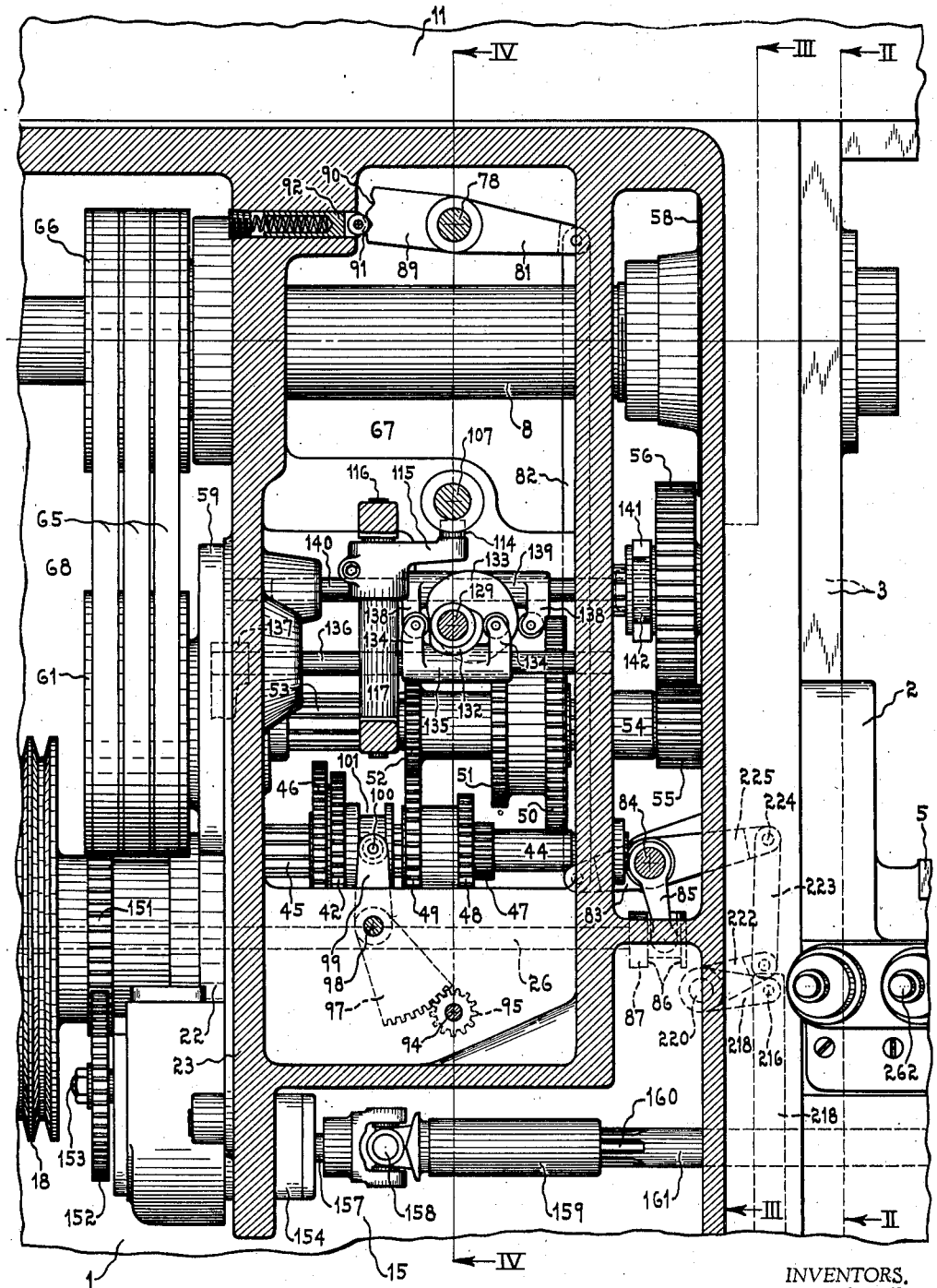

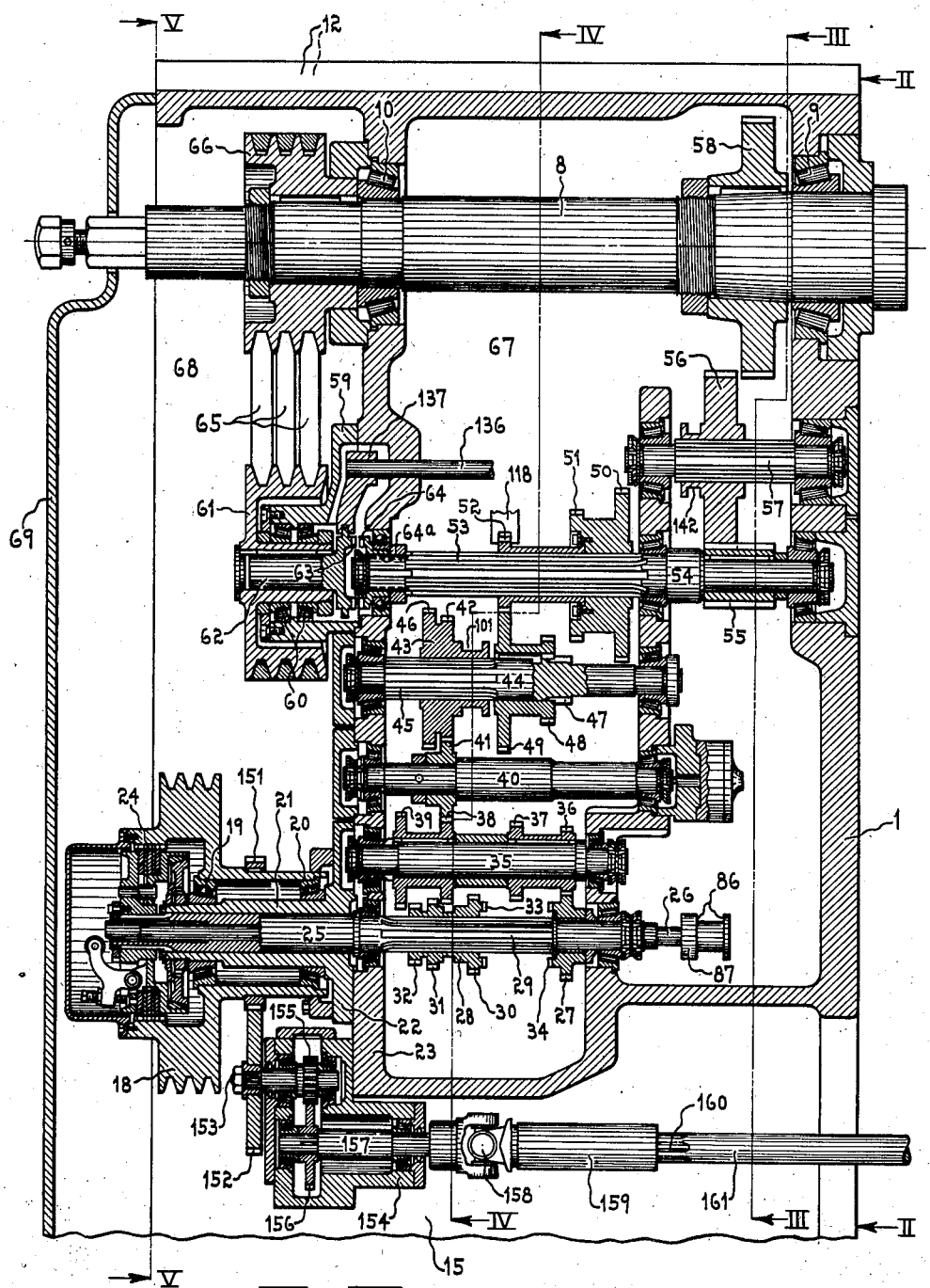

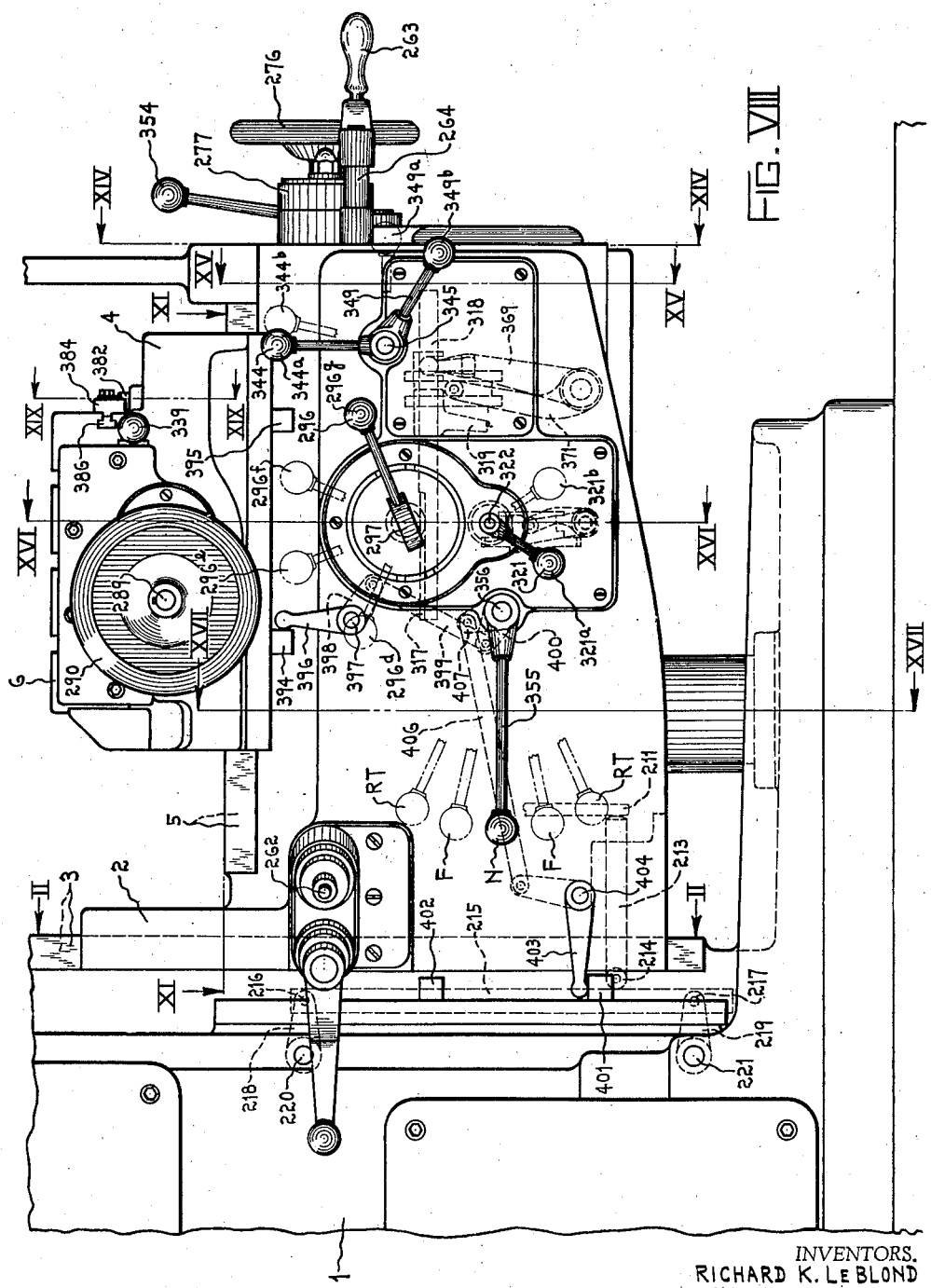

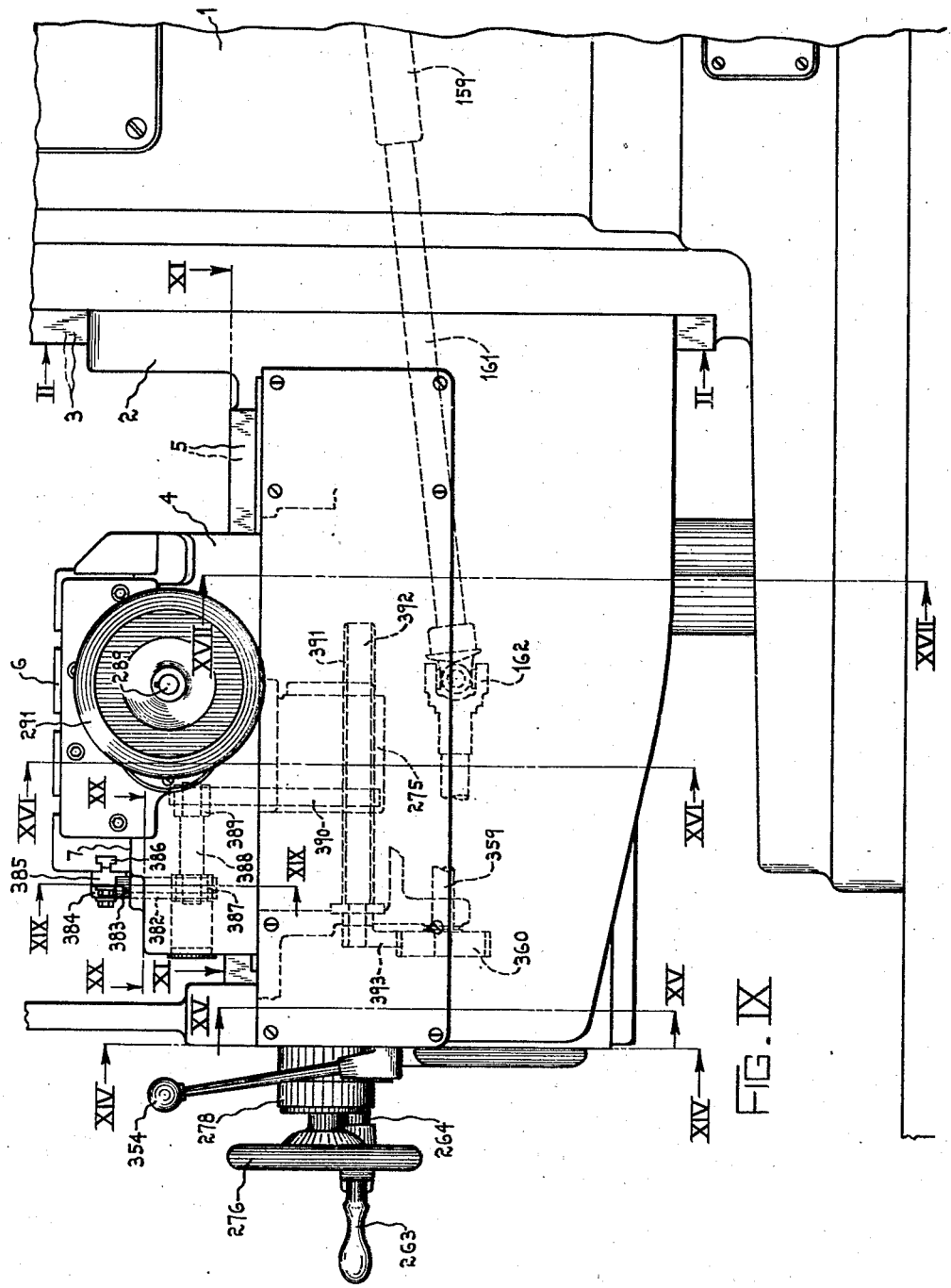

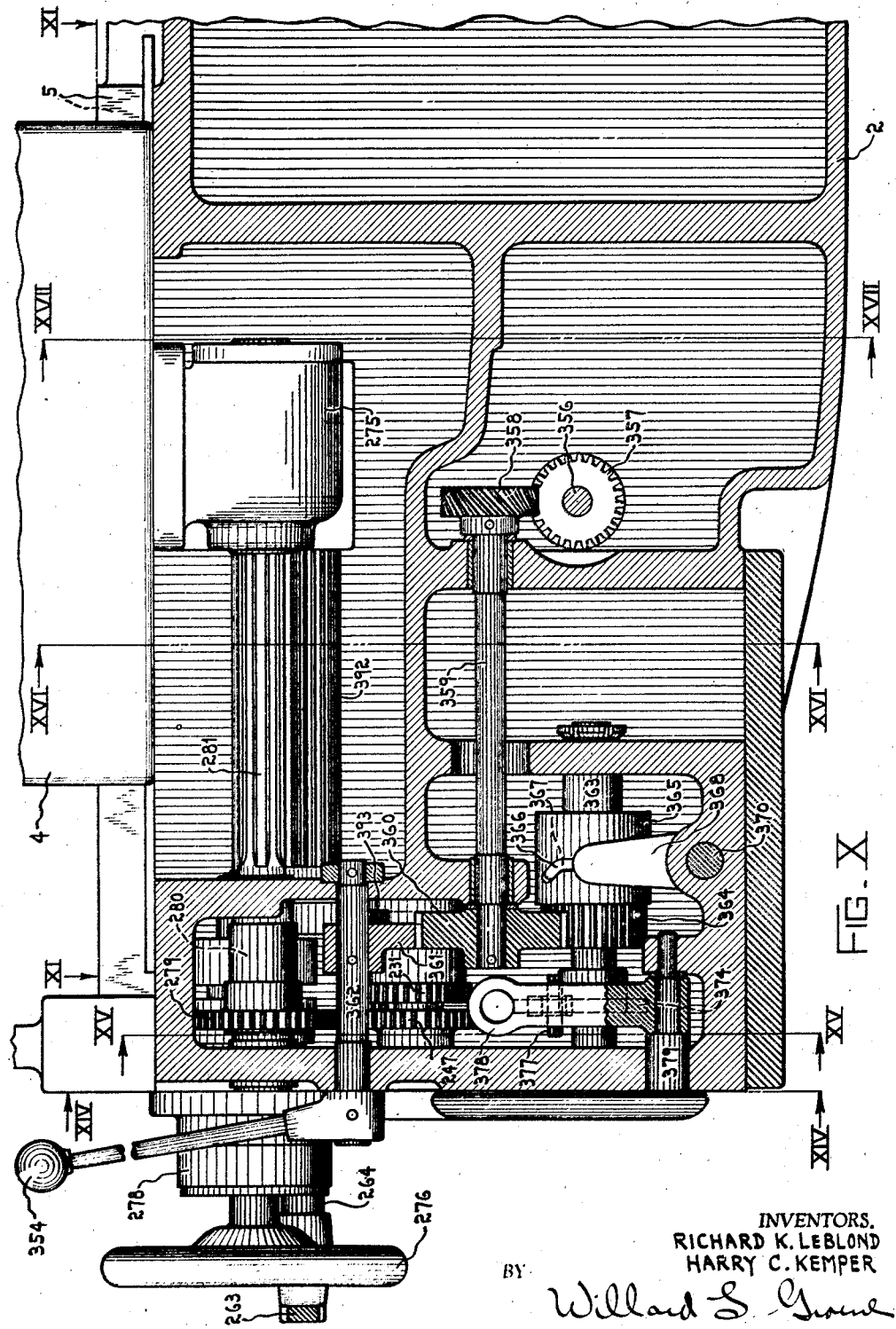

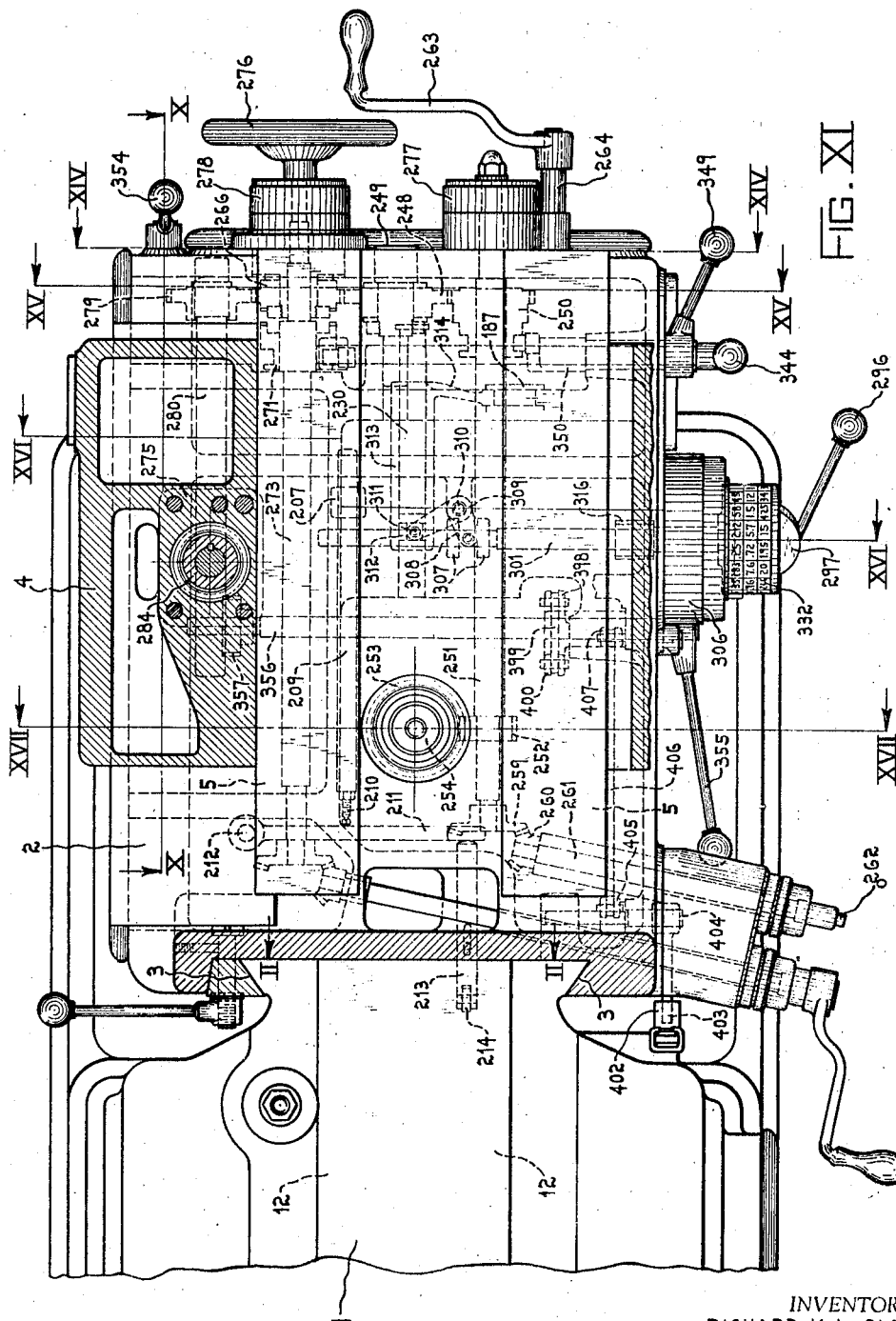

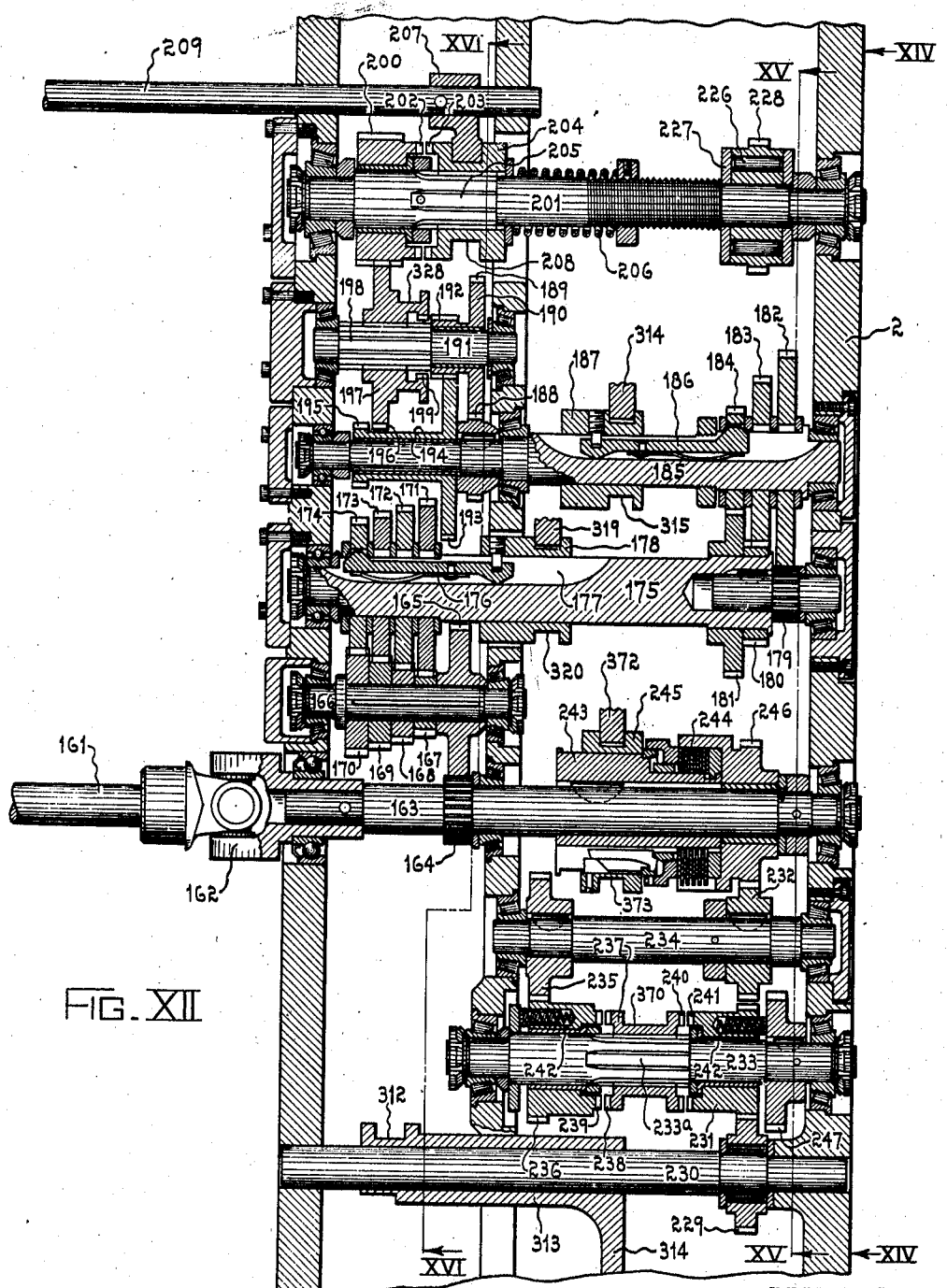
FIG. XII

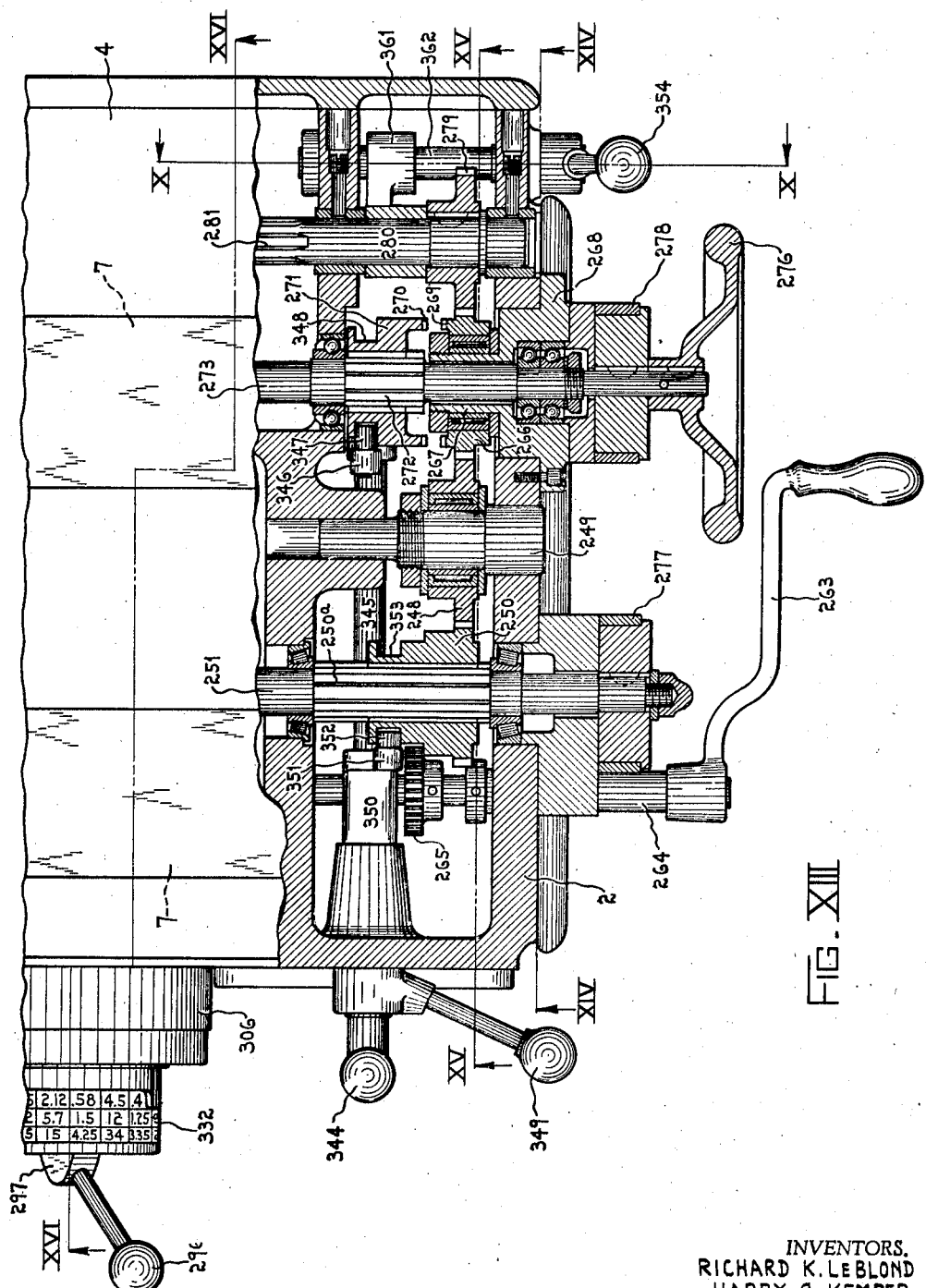
FIG. XIII
INVENTORS.
RICHARD K. LeBLOND
HARRY C. KEMPER
BY Willard L. Grow Jan. 4, 1944. R. K. LE BLOND ET AL 2,338,121
MILLING MACHINE TRANSMISSION AND CONTROL MECHANISM
Filed Oct. 14, 1941 19 Sheets-Sheet 14
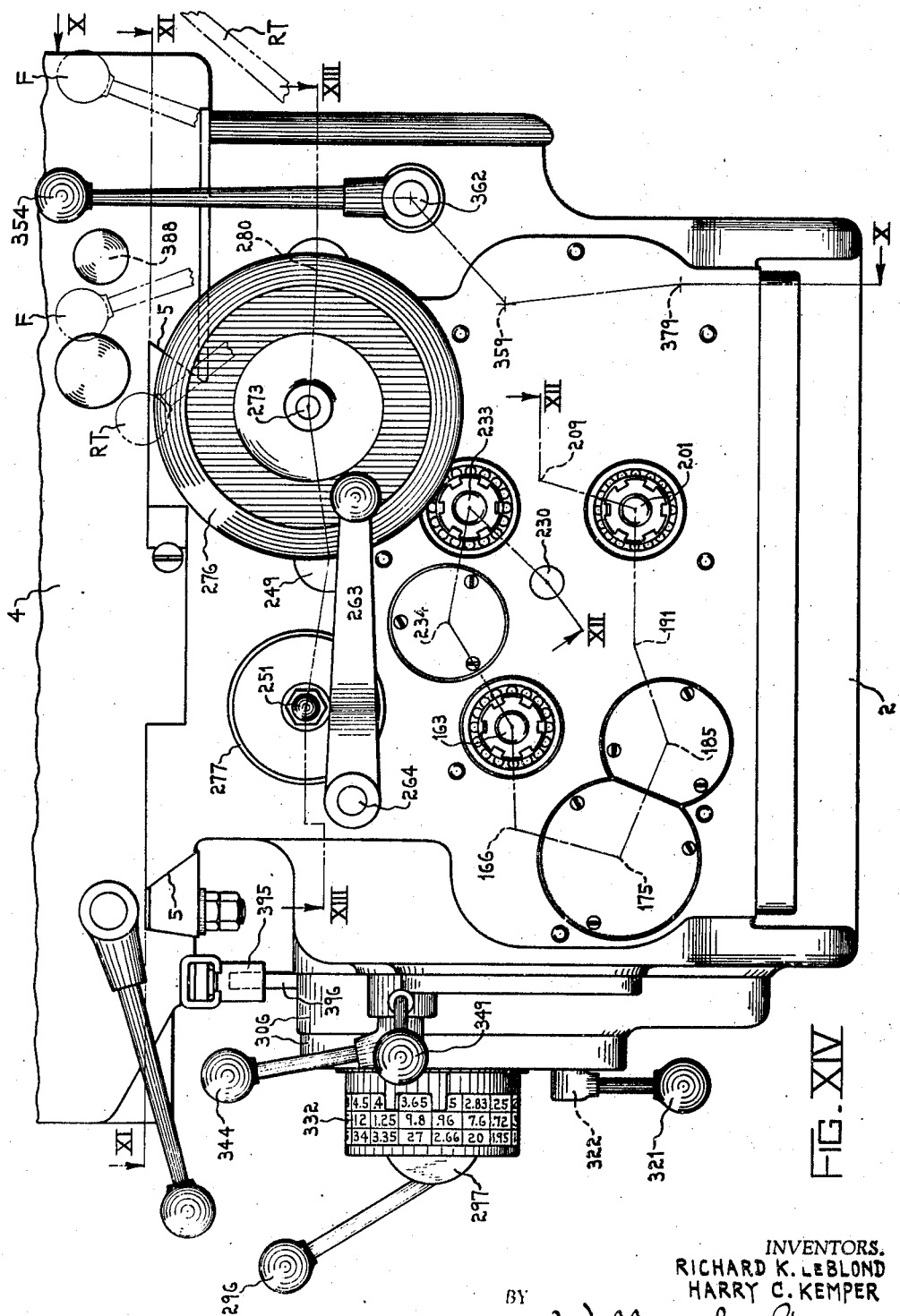
INVENTORS.
RICHARD K. LeBLOND
HARRY C. KEMPER
BY Willard S. Given

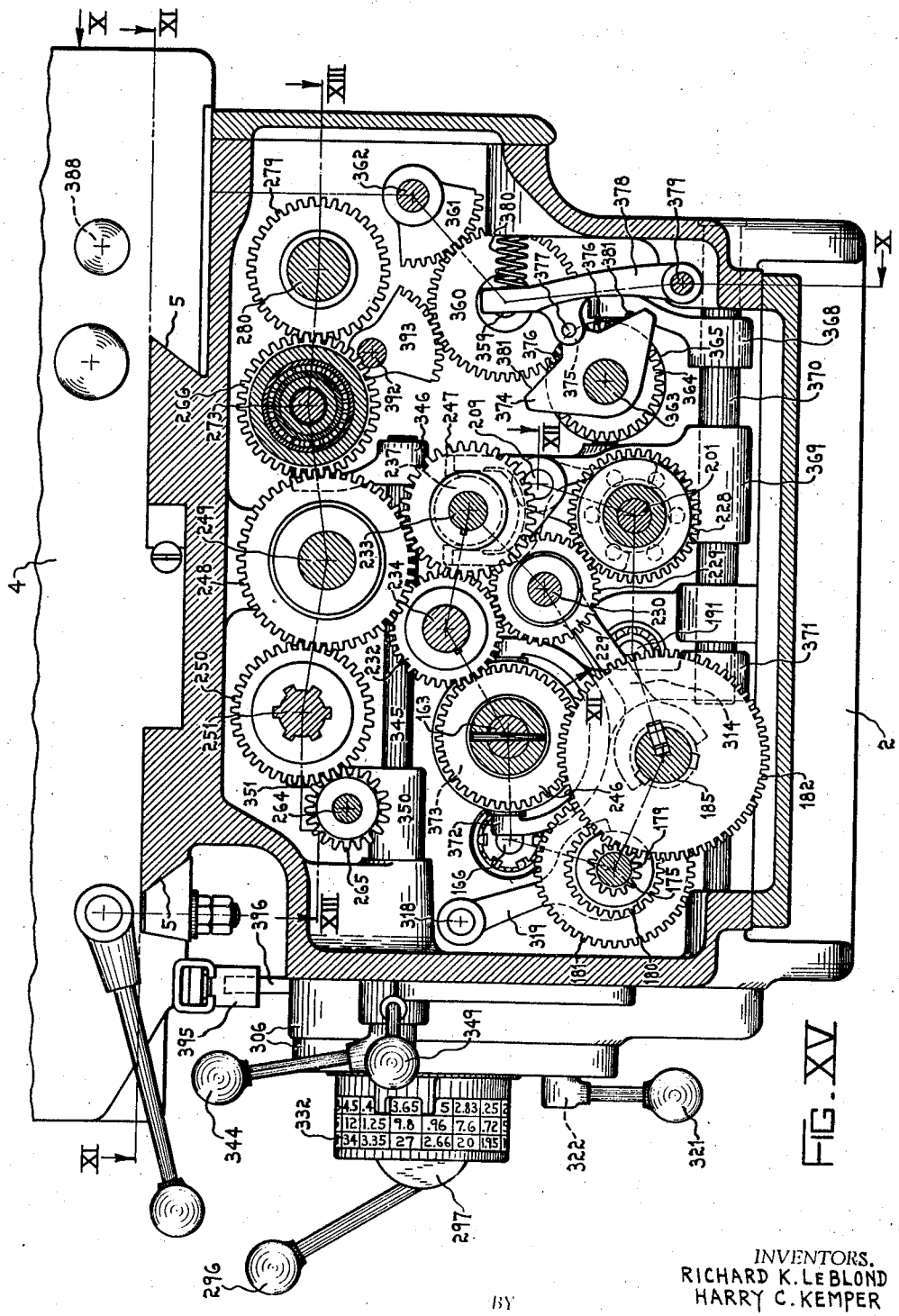

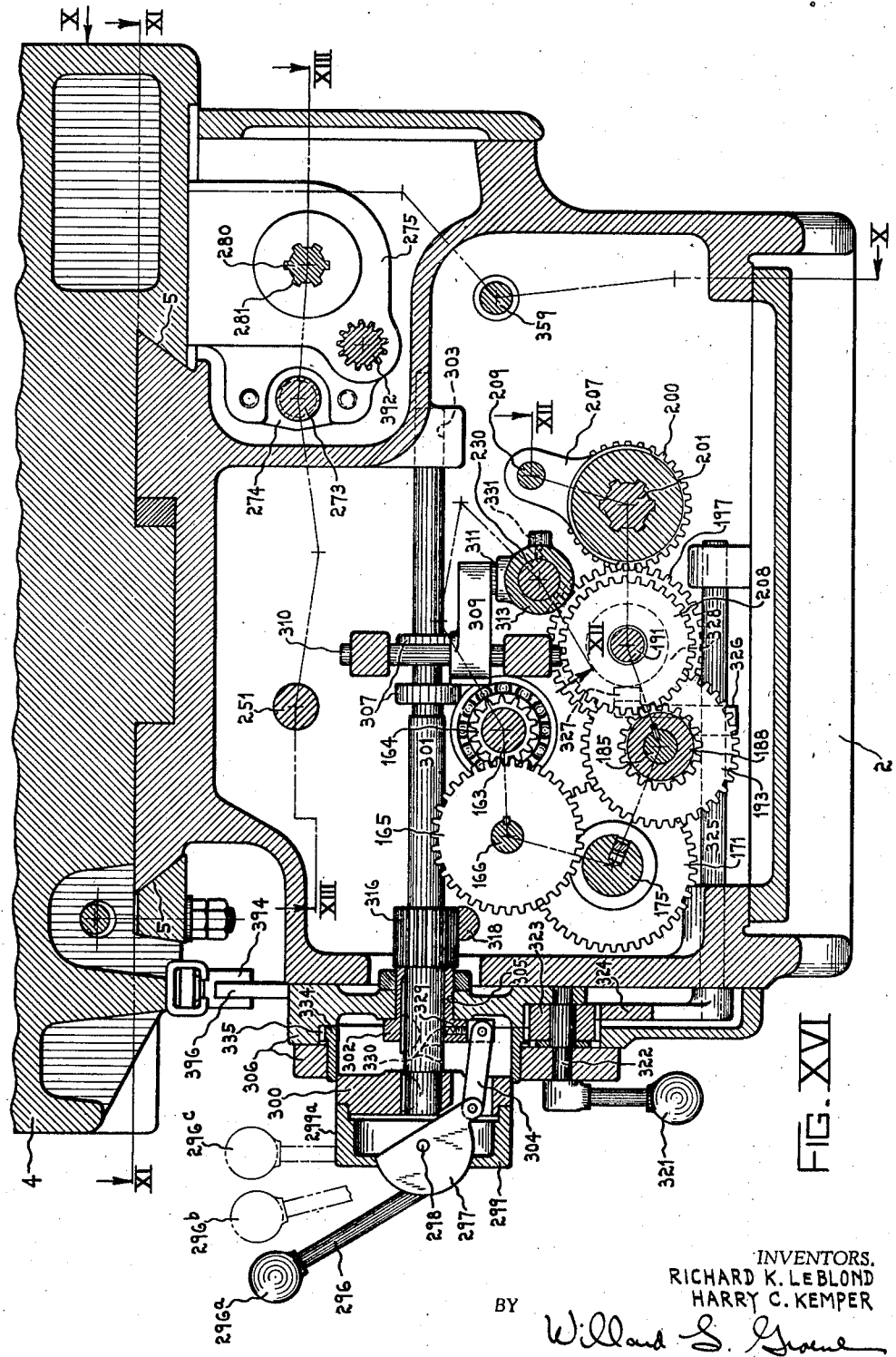

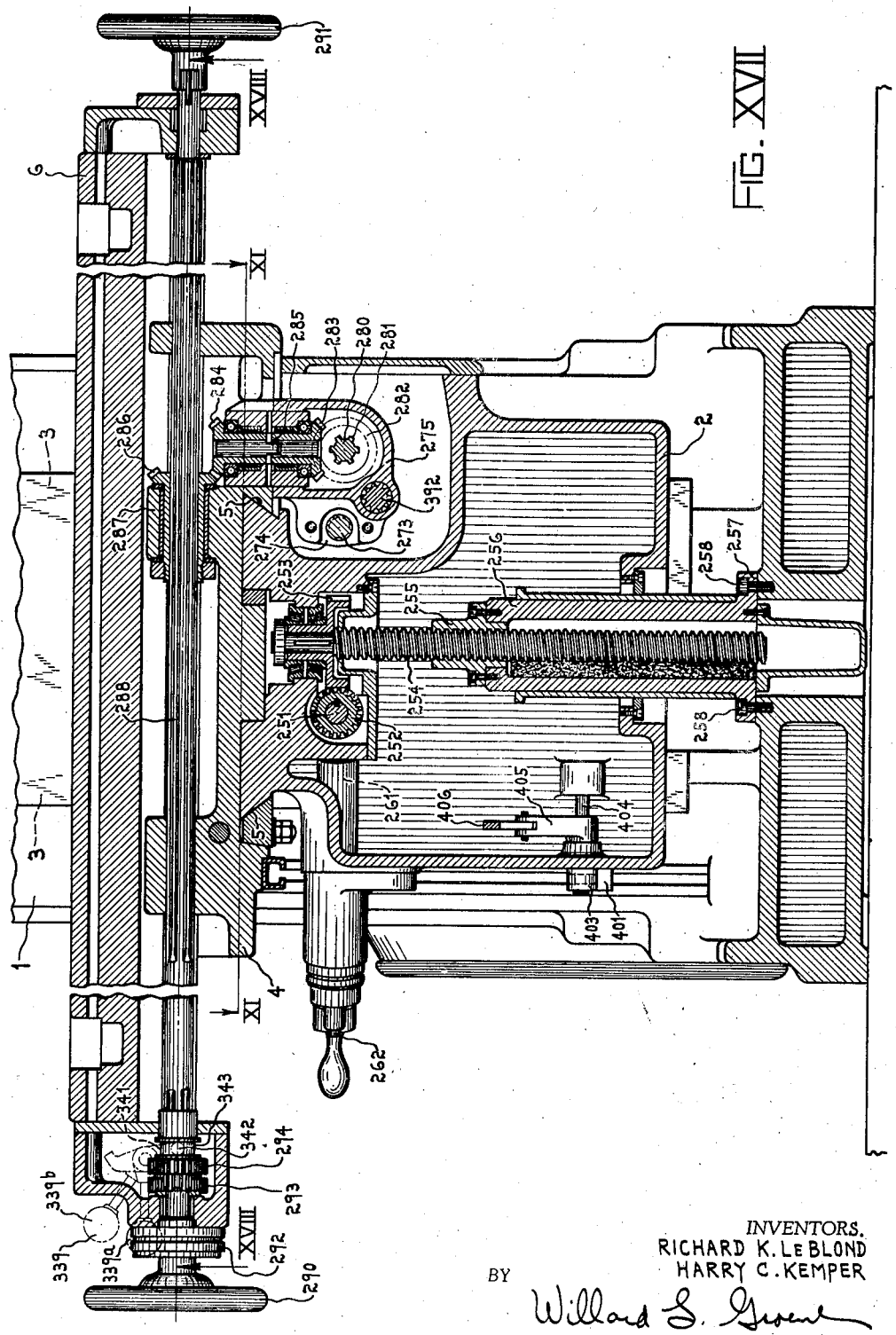

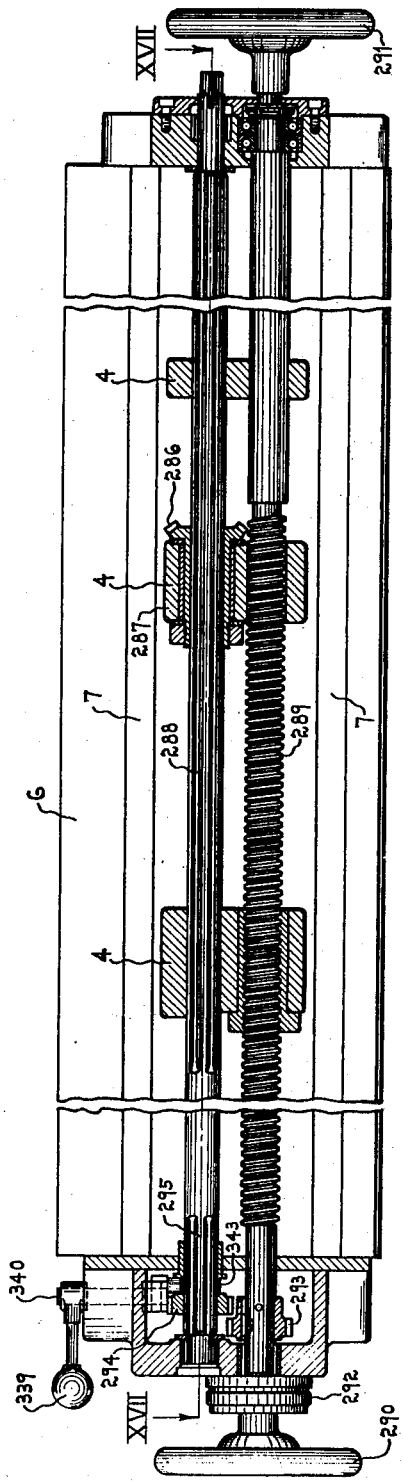

UNITED STATES PATENT OFFICE 2,338,121

MILLING MACHINE TRANSMISSION AND CONTROL MECHANISM

Richard K. Le Blond and Harry C. Kemper, Cincinnati, Ohio, assignors to The R. K. Le Blond Machine Tool Company, Cincinnati, Ohio, a corporation of Delaware Application October 14, 1941, Serial No. 414,962

6 Claims. (Cl. 90—18)

This invention pertains generally to transmission and control mechanism for milling machines, and is especially related to such mechanism for effecting and controlling rotation of the spindle, tool or cutter and the movements of the knee, the saddle, and the table, of such milling machines, which are generally known as the knee, and saddle type milling machines.

This invention covers certain specific improvements in former apparatus for such milling machines in providing greater ease and facility in operating the various moving members of the machine and in controlling them with a minimum of fatigue, thought, and effort upon the part of the operator performing machining operations in the machine tool. It is also an object to provide a greater range of cutting speeds for the tool spindle, and a greater degree of control for the work table so as to render the machine readily adaptable to the utilization of the most modern and up to date type of carbide cutting tools.

More specifically, an object of this invention is to provide a large speed variation for the tool spindle so as to cover a complete range of working speeds necessary in a modern milling machine to take full advantage of the latest types of cutting tool steels and carbides, while at the same time permitting a full range of machining for all types of materials to be cut on the machine. In this connection, it is an object to provide a series of change speeds for the tool spindle comprising two series of ranges, a high range having a series of different speeds, and a low range having a series of different speeds, with the main object in mind of providing direct belt drive to the cutter spindle for the high range of speeds and to provide direct gear drive to the cutter spindle when utilizing lower cutter spindle speeds.

It is also an object, in utilizing this high speed direct belt drive and the low speed direct gear drive for the cutter spindle, to provide means to facilitate changing the belts of the high speed direct belt drive to the cutter spindle while at the same time providing suitable arrangement in the machine to segregate the gear drive from the belt drive transmission so that thorough lubrication can be at all times applied to the gear drive transmission without in any way affecting the belt drive arrangement.

It is also an object of this invention to provide in a milling machine having a cutter spindle driven at relatively high speed by direct belt drive and at relatively low speed by direct gear drive, a simplified arrangement for removing the belts from the belt driving mechanism without in any way dismantling any mechanical part of the machine to effect this change of belts.

It is also an object, in connection with this belt drive arrangement associated with the gear drive mechanism for the cutter spindle, to so arrange the housing or column for the milling machine so that the belt drive will be at all times totally enclosed during the operation of the machine tool and yet readily accessible to the operator in the event that adjustment or changing of the belt be necessary.

It is a further object, in connection with this combined belt and gear drive for the cutter spindle, to provide a single handle control mechanism for effecting the selection of the direct drive high speed range or the direct gear drive low speed range. This single lever control is associated with a single lever control mechanism for effecting the primary or smaller increments of speed variation for each of the belt and gear drives to the cutter spindle.

It is also an object to arrange the universal joint drive shaft from the tool spindle transmission in the column to the work feed transmission in the knee so that it will be totally enclosed by the column and knee and will be located substantially centrally thereof.

Another object of this invention is to modify the conventional clutch and brake control lever for connecting or disconnecting main drive power to the cutter spindle and feed transmission of the milling machine in that an additional lever is provided on the column of the machine tool located a height substantially that of the normal table height of the machine when in operation, and associated with the single lever range control and the single lever primary speed change control for the cutter spindle in order that it may be manipulated simultaneously with the manipulation of said single lever control to facilitate changing of the spindle speeds.

Another object of this invention is to provide, in a milling machine having a tool spindle adapted to be driven at a series of different rates of speed and a work table, saddle, and knee to be actuated at different rates of feeding, a single lever control mechanism comprising primary speed changes and main range of feed changes each operated by a single lever in such a way that the similar mechanism of substantially identical design, operation, and appearance is provided for the tool spindle and the work table, saddle, and knee of the milling machine. In this way the similarity of the two speed changing devices, one for the cutter spindle and the other for the feeding of the work relative to the cutter on said cutter spindle, are substantially identical design, appearance, and operation, to thereby minimize confusion and thought being required upon the part of the operator in manipulating these controls to effect the necessary spindle rotation and work speeds for the machine.

Another object of this invention is to provide control levers on the machine, particularly in connection with the knee, saddle, and table movements which are so positioned as to move in the direction of the relative movement of the member which it controls, that is, the lever for effecting up and down movement of the knee is arranged to have up and down movement so as to immediately indicate to the operator by a mere movement of the lever which way the member he is controlling by that lever will move, thus greatly minimizing error in the control of the machine and minimizing mental effort and skill upon the part of the operator in effecting the various movements of the knee, saddle, and table of the machine.

Another object of this invention is to provide a single control lever manipulatable each side of a neutral position for effecting feed in either direction or rapid traverse in either direction for the knee, saddle, or table, the particular member to be so actuated in feed or rapid traverse in either direction being set in motion by an individual motion control lever for each knee, saddle, and table or if desired all or any pair of these members may be operated simultaneously without damage to the machine.

A further object of this invention is to provide in a milling machine having a knee, saddle, and table, a single control lever associated with each knee, saddle and table for rendering each of these members operative or inoperative, while providing another single lever capable of movement for effecting rapid traverse and feed for each of these members in either direction as determined by the position of the individual selection lever for each knee, saddle, and table.

It is a further object, in connection with the utilization of an individual motion selecting lever for each knee, saddle, and table member in conjunction with a master lever for effecting feed or rapid traverse motions of each of the members selected in either direction, to provide an arrangement whereby the movement of the individual members are adapted to trip the master feed and rapid traverse lever but which members in no way effect the motion selection levers for each of these members of the machine. For example, when the table is moved to the end of its feeding cycle it will trip the master lever to neutral position thus stopping feed in one direction, and it is then merely necessary to move this same lever in the reverse direction to effect feed or rapid traverse immediately of the table in the opposite direction without in any way disconnecting or effecting the motion selection lever for the table. Similarly it is an object to effect the same type of control for the saddle and knee from the master feed and rapid traverse control lever for either direction.

Another object of this invention is to provide an arrangement in connection with the elevating hand crank for manually raising and lowering the knee that will automatically disconnect the mechanism for actuating the elevating screw by power when the hand crank is applied to the screw and which will automatically disconnect the hand crank when power is connected thereto, the object being to prevent rapid rotation of the elevating hand crank when the knee is being rapidly traversed up or down by power, which might otherwise result in injury to the operator.

Another feature of this invention is to provide an arrangement in conjunction with the transmission mechanism of the milling machine such that the knee, saddle, and table may be actuated and rapidly traversed at all times, whether or not the cutter spindle is operating, so as to facilitate setting up of work and in manipulating the machine at times when the cutter spindle is not operating.

Still another feature of this invention is to provide an overload or safety clutch device which is interconnected with the clutch and brake device for controlling power from the main drive motor to the transmission of the machine tool, in such a way that overloading or interference with the free motion of the saddle, table, or knee during any machining operation will automatically effect a disengagement of the feed for the member being so actuated, while at the same time permitting continued rotation of the cutter spindle, this overload clutch being also operable by the disengagement of the clutch and brake drive to effect stopping of the feed when the tool spindle is stopped. In this way damage to the machine is prevented in the event an obstruction should be met by the cutter in passing over the work being machined.

Further features and advantages of this invention will appear from a detailed description of the drawings in which:

Figure I is a left hand side elevation of the column of the milling machine, particularly showing the control levers for the main drive clutch and brake mechanism, the change speed control levers for the cutter spindle, the spindle reversing control lever, and the electrical push button station for controlling the main drive motor and a coolant pump motor when utilized.

Figure II is a front elevation of the milling machine, partly in section, on the line II—II of Figures I, VI, VII, VIII, IX, and XI.

Figure III is a vertical transverse section through the column of the milling machine on the line III—III of Figures I, VI and VII.

Figure IV is a vertical transverse section through the column of the milling machine on the line IV—IV of Figures I, VI, and VII.

Figure V is a rear view of the column of the milling machine with the belt cover removed, particularly showing the main drive motor and its connection to the transmission of the machine and the direct belt drive for the high speed rotation of the cutter spindle, shown on the line V—V of Figures I, and VII.

Figure VI is an enlarged fragmentary section of the control mechanism for the spindle drive transmission in the column as indicated by the line VI—VI on Figures II, III, IV, and V.

Figure VII is a diagrammatic section through the transmission mechanism for rotating the cutter spindle through the direct gear drive and through the high speed belt drive and also shows the power take-off for the feed drive transmission in the knee of the machine, as indicated by the line VII—VII in Figures II, III, IV, and V.

Figure VIII is a left hand side elevation of the knee, saddle, and table of the milling machine shown in Figure I, particularly illustrating the control levers for effecting the change of feeds for the knee, saddle, and table; the rapid traverse and feed lever, and the various other motion selecting levers and manual manipulating lever for the knee, saddle, and table.

Figure IX is a right hand side elevation of the knee, saddle, and table shown in Figure VIII.

Figure X is a transverse section through the knee, on the line X—X of Figures XI, XIII, XIV, XV, and XVI.

Figure XI is a plan view of the knee of the milling machine shown with the saddle and table removed from the top thereof as indicated by the line XI—XI in Figures VIII, IX, X, XIV, XV, XVI, and XVII.

Figure XII is a diagrammatic sectional view through the speed drive transmission in the knee of the machine tool shown on the line XII—XII of Figures XIV, XV, and XVI.

Figure XIII is a fragmentary sectional view of a portion of the transmission mechanism in the knee of the machine as shown on the line XIII—XIII of Figures XIV, XV, and XVI.

Figure XIV is an enlarged front elevation of the knee shown, with the cover plate removed, on the line XIV—XIV of Figures VIII, IX, X, XI, XII, and XIII.

Figure XV is a transverse section through the transmission mechanism in the knee of the machine shown on the line XV—XV of the Figures VIII, IX, X, XI, XII and XIII.

Figure XVI is a transverse section through the transmission mechanism in the knee of the machine on the line XVI—XVI of Figures VIII, IX, X, XI, XII, and XIII.

Figure XVII is a section through the knee, saddle, and table of the machine, particularly showing the elevating screw and the power transmission from the knee to the actuating mechanism for the work table, shown on the line XVII—XVII in Figures VIII, IX, X, XI, and XVIII.

Figure XVIII is an underneath view of the bottom of the work table of the machine, shown on the line XVIII—XVIII of Figure XVII.

Figure XIX is an enlarged fragmentary view of the feed trip mechanism operated by the movement in the work table shown on the line XIX—XIX of Figures VIII, IX, and XX.

Figure XX is a fragmentary view of a portion of the feed trip control mechanism for the work table shown on the line XX—XX of Figures IX and XIX.

Figure XXI is a spread out view of the periphery of the indicating dial on the primary speed change selector lever for the control on the knee of the milling machine particularly showing the relative positions of the indicator and dial for selecting all speed ranges desired.

Figure XXII is a similar stretched out view of the periphery of the indicating dial for the cutter spindle speed change control lever, particularly showing the relative positions of the dial and indicating device associated with it for selecting all speed ranges desired for the cutter spindle.

For illustrative purposes this invention is shown applied to a conventional plain knee and saddle type milling machine, comprising a column 1 upon which is vertically reciprocatably mounted the knee 2 on suitable guide ways 3 formed on the front face of the column 1. On top of the knee is reciprocatably mounted the saddle 4 for horizontal movement on suitable guide ways 5 formed on the top of the knee 2, and on top of the saddle 4 is slidably mounted the work table 6 upon suitable guide-ways 7 formed on top of the saddle 4.

In the column 1 is appropriately journaled cutter spindle 8 on suitable bearings 9 and 10 to which may be connected the various rotary milling cutters or arbors which are in turn supported at their outer end by conventional means such as the overarm support 11 mounted in suitable guide-ways 12 in the top of the column 1.

*Tool spindle drive transmission*

Referring particularly to Figures V and VII, power for rotating the tool spindle 8 is derived from the main drive motor 13 appropriately mounted on a suitable motor plate 14 in the cavity 15 formed in the column 1 of the machine. This main drive motor 13 is connected through its pulley 16 and suitable feed belts 17 to the main driving clutch and brake pulley 18 which is appropriately journaled on suitable bearings 19 and 20 carried by the projecting shaft 21 of a bracket 22 fixed to the partition wall 23 formed in the column 1 of the milling machine.

The driving pulley 18, through conventional clutch and brake mechanism 24 of a type for example as shown in Patent #1,474,112, dated November 13, 1923, may be alternately connected to or disconnected from the pulley shaft 25 by appropriately actuating the control rod 26 passing through the center of this shaft and actuating the clutch and brake device 24 in the conventional manner. In this way power is delivered to the shaft 25 upon which is journaled a relatively large driving gear 27 and a shiftable multiple gear 28 on the splined portion 29 of the shaft 25 having progressively smaller gears 30, 31, and 32 with respect to the gear 27 and also having clutch teeth 33 adapted to be engaged with mating teeth 34 on the gear 27 so that when these clutch teeth are engaged the gear 27 will be positively driven by the gear 28 from the shaft 25.

A second shaft 35, Figures II, IV, and VII, has fixed on it a series of gears 36, 37, 38, and 39 all arranged to rotate positively together. The gear 36 is constantly in mesh with the gear 27 while the gears 37, 38, and 39 are respectively engageable with the gears 30, 31, and 32 by appropriately sliding the multiple gear 28 on the splined portion 29 of the shaft 25 so that the shaft 35 may be driven at a plurality of four different speeds relative to the shaft 25.

A third shaft 40 has fixed on it a gear 41 which is arranged constantly in mesh with the gear 38 on the shaft 35 and which gear 41 in turn is arranged to be engaged by a gear 42 of a compound gear 43 slidably mounted on a shaft 44 in driving relation on the splined portion 45, thereof. This gear 43 on the shaft 44 is also arranged to slide to bring its gear 46 into direct driving engagement with the gear 39 on the shaft 35. In this way rotation of the shaft 44 from the shaft 35 may be had through the driving transmission train 38—41—42 or by shifting the compound gear 43 so that the driving power will then be transmitted from the gear 39 of the shaft 35 directly to the gear 46 to the shaft 44, so as to effect reversal of rotation for the shaft 44 as desired by appropriately shifting the gear 43.

Also fixed on the shaft 44 are a series of three gears 47, 48, and 49 which are arranged to be respectively engaged by the bears 50, 51, and 52 of a triple gear arrangement slidably mounted on the splined portion 53 of the shaft 54. By appropriately sliding the triple gear combination of gears 50—51—52 a plurality of three different speed ranges may be had between the shaft 44 and 54 and in conjunction with the four speed changes effected between the shafts 25 and 35 a series of twelve different speeds may be effected between the pulley drive shaft 25 and the shaft 54 by appropriately shifting the gear 28 and the triple gear 50—51—52.

From the shaft 54 power may be delivered to the tool spindle 8 either directly by gear drive for relatively slow speed for roughing cutter speeds or directly through belt drive transmission to the spindle to effect relatively high speed finishing cutting operations. The gear drive to the spindle 8 is effected from the pinion 55 fixed on the shaft 54 which in turn drives a gear 56 slidably mounted on a shaft 57 which in turn engages with the gear 58 fixed on the tool spindle 8 of the machine. The gear 56 is arranged in constant mesh with the gear 55 and to slide on the shaft 57 into or out of meshing engagement with the gear 58 on the spindle 8.

Journaled on the bracket 59 fixed to the partition 23 in the column of the milling machine on suitable bearings 60 is the high speed driving pulley 61. In the center bore of this pulley is slidably mounted a stub shaft 62 in sliding keyed driving relationship so as to permit axial sliding of the shaft 62 in this pulley to engage its clutch teeth 63 with mating clutch teeth 64 fixed on a clutch member 64a fixed on the shaft 54, so that by axially moving the stub shaft 62 the pulley 61 may be alternately connected or disconnected in driving relation with the shaft 54. The pulley 61 is directly connected through appropriate V belts 65 with the spindle pulley 66 fixed on the rear portion of the tool spindle 8. It is thus apparent that the method of operation of this latter drive comprises either engaging the gear 56 with the gear 58 while the clutch members 63 and 64 are disengaged to effect powerful slow speed gear drive for the tool spindle 8 or disengaging the gears 56 and 58 and engaging the clutches 63 and 64 to effect relatively high speed driving to the pulley 61 and the belts 65 and the pulley 66 mounted on the tool spindle 8. In this way the advantages of powerful gear driving at slow speeds for taking heavy roughing cuts may be readily available while at the same time therein is provided a relatively high speed, noiseless, chatter-free, drive for the tool spindle for high speed cutting operations or for utilizing small cutters for relatively small areas of milling.

The combination direct gear drive and belt drive arrangement for the tool spindle 8 is unique in that the belt drive from the pulley 61 belts 65 to pulley 66 is fully segregated from association with the gear transmission from the shaft 25 to the tool spindle 8. This is accomplished by providing the partition 23 in the column 1 of the machine so as to have a cavity 67 in which all of the gear transmission is self contained and totally enclosed for proper and thorough lubrication for all of the moving parts of this gear transmission. This partition 23, therefore, separates the gear transmission chamber 67 from a cavity 68 formed in the rear portion of the column of the machine tool and which is normally covered by a movable cover 69 on the rear of the column of the milling machine, this belt drive cavity 68 being best shown in Figure V. In this chamber 68 is contained the main drive motor 13 and its drive to the pulley 16, belts 17, and the pulley 18 as described and also the belt drive from the pulley 61, to belts 65, to pulley 66 on the tool spindle 8.

It is also to be noticed in connection with this latter belt drive that an idler pulley 70 is provided on a suitable sliding bracket 71 which may be moved in a direction of the line 72 to effect first of all, the adjustment of the belts 65 properly around the pulleys 61 and 66 by appropriately manipulating the screw 73 and the locking screws 74 and second, to provide means by adjusting the pulley 70 to a loose position for the belts 65 for readily taking off and changing the belts 65 without disassembling any pulleys or other mechanism of the belt drive transmission between the shaft 54 and tool spindle 8. By this arrangement has been provided a completely enclosed, yet segregated operating cavity for the belt drive transmission and at the same time means for easily replacing the belts or adjusting them without interfering with the gear transmission of the machine.

*Tool spindle transmission control*

The main drive motor 13 is normally continuously operating at constant speed and may be stopped and started by appropriately manipulating the start and stop push buttons 75 and 76, Figure I. The combined brake and clutch device 24, Figure VII, is driven through the pulley 18 from the constantly operating motor 13 and is controlled by means of the spindle control lever 77, Figures I, IV, and VI, fixed on the rock shaft 78 journaled in suitable bearings 79 and 80 in the column 1 of the machine. A lever arm 81 is fixed on this rock shaft 78 from which downwardly extends a link 82 which in turn is connected to a lever 83 fixed on a second rock shaft 84 to which is also connected the bifurcated lever 85 whose arms project each side of and into the slot 86 formed in the spool 87 fixed on the control rod 26 for the combined clutch and brake 24 so that by raising and lowering the lever 77 the control rod 26 may be axially reciprocated through its spool 87 to effect engagement or disengagement of the clutch and brake device 24. On the rock shaft 84 is also fixed a control lever 88 which may be similarly actuated up and down to effect the control of the combined brake and clutch device 24. Appropriate detent means comprising the arm 89 having notches 90 and 91 operating against the spring or plunger 92 in the column partition 23 serves to position the levers 77 and 88 in either the engaged or disengaged position for the combined brake and clutch device 24.

The reverse rotation of the tool spindle 8 is accomplished by shifting the compound gear 43, Figure VII, as described for engagement of either the gears 41 and 42 or the gears 39 and 46. Shifting of this compound gear 43 is accomplished by means of the spindle reverse lever 93, Figure I, which may be swung from the position shown at 93a to position 93b. This lever 93 is carried on a rock shaft 94 best seen in Figure IV on the inner end of which is fixed a pinion 95, Figure VI, which in turn operates in a segmental gear lever 97 on a suitable stud 98, and has projecting upwardly from it a lever arm 99 with a suitable roller pin 100 operating in the annular slot 101 of the compound gear 43, so that when the lever 93 is moved to the position 93a the gears 41 and 42 will be in mesh to give rotation to the tool spindle 8 in one direction and by swinging the lever 93 to the position 93b the gears 39 and 46 will be brought into engagement for the reverse rotation of the tool spindle 8.

The twelve primary speed changes for the tool spindle 8 as effected by the sequential movement of the triple gear 28 and the triple gear 50—51—52 as described and is accomplished by means of the control lever 102 as best seen in Figures I and IV which is connected to a rocking segmental block 103 carried on a pivot pin 104 in the dial drum 105 which is rigidly secured to a disc piece 106 fixed to the rocking and axially slidable shifting shaft 107, which is slidably mounted in a bushing 108 and keyed therein so as to cause the bushing 108 to rotate with it and is journaled at its outer end in a suitable bearing 109 in the column 1. The lower portion of this block 103 is connected by a link 110 with the bushing 108 so that as the lever 102 is moved to the various positions 102a, 102b, or 102c the shaft 107 will likewise be slid axially to these three respective positions, since the bushing 108 is free to rotate in a suitable bore 111 in the bracket 112 fixed to the column 1 of the milling machine while at the same time is free to rotate in the bore 111 without axial movement therein.

On the shaft 107 are a pair of fixed collars 113, between which operate a pin 114 carried on a lever arm 115 which is fixed on a rock shaft 116 to which is also fixed a swinging lever arm 117 having a suitable shoe 118 operating each side of the gear 52 of the triple gear 50—51—52, so that as the lever 102 is moved in and out to the various positions 102a, b, or c the triple gear 50—51—52 will be correspondingly moved to the three positions of engagement with the respective gears 47, 48, and 49 on the shaft 44. In this way three ranges of primary speed changes are effected.

The lever 102 also is adapted to effect the four speed changes in moving the triple gear 28 on the shaft 25 by swinging of the lever around the axis of the shaft 107 to the various positions 102d to 102g as best shown in Figure I. In thus rotating the lever 102 the shaft 107 will likewise be rotated and will cause segmental gear 119 fixed on its inner end to actuate the swinging segmental lever 120 on its pivot pin 121 and which has its segmental gear 122 on its lower end to cause the sliding of a shifter fork 123 on a shaft 124 fixed in the column 1 so as to respectively slide the gear 28 to its various engagements with the clutch 34 and the gears 37, 38, and 39 on the shaft 35 as described. A suitable detent 125 carried in the bushing 108, and operating in appropriate notches 125a serves to position the lever 102 in any of the three selected positions 102a, b, or c. A detent 126 carried in the shifter yoke 123 and operating in appropriate detent notches 127 in the rod 124 fixed in the column 1 serves to position the handle in the four positions 102d, e, f, and g. Thus by means of this single lever 102 twelve speeds may be selected for the tool spindle 8 by swinging the lever from right to left as shown in Figure I or pulling it in and out as shown in Figure IV.

The selection of the direct gear drive or the direct belt drive ranges for the tool spindle 8 is effected by the control lever 128 associated with the control lever 102 and directly below it as shown in Figure I. This lever 128 is carried on a rock shaft 129 appropriately journaled in suitable bearings 130 and 131 in the column 1 of the machine as best seen in Figure IV. On this rock shaft 129 are a pair of cams 132 and 133. The cam 132 operates between the roller arms 134 of a dog 135 fixed to the shifter rod 136 slidably mounted in appropriate bearings in the column 1 of the machine and has on its outer end a shifter yoke 137, Figure VII which is arranged to engage the stub shaft 62 to shift its clutch member 63 into or out of engagement with the clutch member 64 on the shaft 54. The cam 133 operates between controller arms 138 of a dog 139 fixed to the shifter rod 140 appropriately slidably mounted in column 1 of the machine and on the outer end of which is a suitable shifter yoke 141 operating in the annular groove 142 of the gear 56 on the shaft 57.

The cams 132 and 133 carried on the shaft 129 are so designed as to effect the appropriate sliding movement in the shift rod 136 so as to alternately engage either the clutch member 63 and 64 or the gears 56 and 58 in relationship so that when the selection lever 128 is in the position 128a the gears 56 and 58 will be in engagement for driving while the clutch members 63 and 64 are disengaged and by moving the lever over to the position 128b the clutch members 63 and 64 will be engaged and the gears 56 and 58 disengaged.

In this way either direct gear drive or direct belt drive may be immediately and easily selected by appropriately moving the lever 128 and it is also to be borne in mind that the ratio through the gear drive is lower than that through the belt drive so that in addition to the twelve speeds effected by the manipulation of the lever 102 a complete new series of speed ranges may be effected by manipulation of the lever 128 so that we have then a series of twenty four speeds for the work spindles; twelve of which are directly gear driven to the gears 56 and 58 and twelve of higher speed which are driven directly through the belt drive constituting a pulley 61, belts 65, and pulley 66 on the tool spindle.

In order to facilitate the selection of tool spindle speeds by means of the levers 102 and 128, dial indicating mechanism is provided in conjunction with these levers and their movement. This dial indicating mechanism is best shown in detail in Figure XXII and comprises an indicating dial 143 fixed on the periphery 105a of the lever disc 105 to which the lever 102 is pivotally mounted as best seen in Figure IV. Thus, the dial 143 has rotational movement due to the rocking of the lever 102 to the four positions 102d, e, f, and g and has in and out motion to the various positions 143a, b, and c corresponding to the positions 102a, b, and c as noted in Figure XXII.

Associated with the dial 143 is an indicating pointer 144 formed on an annular ring 145 journaled for rotational movement about the axis of rotation of the shaft 107 of the lever 102 in the bracket 112 and has a notched portion 146 which frames each of the individual indicating numbers for the tool spindle rotational speed as the dial 143 is moved to the various positions by the lever 102. It is to be further noticed that the indicating dial 143 is composed of two series of numbers those in group 147 which shows the tool spindle speeds when the direct gear drive to the tool spindle through the gearing 55, 56, and 58 is in operation and the group of figures 148 which indicate the tool spindle speeds when the direct belt drive through the pulley 61, belts 65, and pulley 66 on the tool spindle are in operation, in order to bring the indicating finger 144 with its indicating notch 146 in the proper position to frame the correct figures for the tool spindle speed being utilized. This indicating notch 146 is caused to be shifted from the position 144a to the position 144b which respectively correspond, in the Figure XXII, to either the belt drive speeds or the gear drive speeds for the tool spindle. This indicating finger 144 is automatically shifted from either of these positions 144a or 144b by rotation of the lever 128 on the shaft 129 through the medium of the pinion 149 fixed on the shaft 129, Figure IV, which engages gear teeth 150 cut on the annular ring 145 so as to just nicely shift indicating pointer 144 to the two positions corresponding to the two positions of the ring selection lever 128 so as to automatically give correct indication for any position of both of the levers 102 and 128. In order to further facilitate the rapid selection and comprehension of the data on the index dial 143 it is desirable preferably to color the one group of figures 147 red for example, and the other group of figures 148 green, so as to immediately tell whether the gear drive red is being utilized or the belt drive green is being utilized.

*Work table actuating transmission*

Power for actuating the knee 2, saddle 4, and work table 6 is derived from the gear 151 fixed to rotate with the main driving pulley 18 at all times while the main drive motor 13 is operating. This gear 151 in turn drives a gear 152 fixed on a shaft 153 appropriately journaled in a bracket 154 fixed to the column 1 of the machine, shaft 153 having a gear 155 which drives a gear 156 fixed on a shaft 157 appropriately journaled in the bracket 154. Ample power from the shaft 157 is transmitted through the universal joint 158 having the usual telescopic sleeve 159 which operates in conjunction with the splined portion 160 of the drive shaft 161. The outer end of this drive shaft is connected through another universal joint 162, Figure XII, to the input drive shaft 163 of the knee 2 of the milling machine.

Power takeoff from the shaft 163 for effecting feeding motion in the knee, saddle, and table is derived from the gear 164 formed integrally on said shaft 163 which drives a gear 165 fixed on a shaft 166 journaled in the knee 2 which also has fixed on it a series of four different size gears 167, 168, 169, and 170 forming a cone of gears each of which is engaged by respective gears 171, 172, 173 and 174 journaled on a dive key shaft 175 appropriately journaled in the knee 2 of the machine. Each of these gears 171, 172, 173, and 174 may be respectively engaged in driving relation on the shaft 175 by the usual dive key 176 which may be slid along in the slot 177 by appropriately moving the actuating spool 178. In this way four different speed changes are effected between the shaft 163 and the shaft 175.

On the shaft 175 are fixed the three different sized gears 179, 180, and 181 which in turn engage respective gears 182, 183, and 184 journaled on the second dive key shaft 185 which is also appropriately rotatably mounted in the knee 2 of the milling machine. Each of the gears, 182, 183, and 184 may be respectively engaged in driving relation on this shaft 185 by appropriately manipulating the usual dive key 186 by means of its actuating spool 187. In this way a series of three different speed variations may be obtained between the shafts 175 and 185 and taken in conjunction with the four different speeds between the shafts 163 and 175 provide a total of twelve different speeds between the shafts 163 and 185 constituting a series of primary speed changes for the knee, saddle, and table feed motion.

Two primary or coarse ranges of feed are effected through the gearing comprising the gear 188 fixed on the shaft 185 which drives the gear 189 of the compound gear 190 rotatably journaled on the shaft 191 which is also rotatably mounted in the knee 2. This compound gear 190 also has the small pinion gear 192 which engages in driving relation with the gear 193 of the compound gear 194 journaled on the shaft 185 and which compound gear 194 also has a pinion 195 formed on it, which may be engaged with the gear 196 of the clutch gear 197 which is slidably mounted by splined connection 198 on the shaft 191 and which gear 197 also has an internal clutch gear 199 adapted to engage over the gear 192 of the compound gear 190. Thus if the clutch 199 is shifted into engagement with the gear 192 the drive to the gear 197 will be effected from the shaft 185 to the respective gears 188, 189, 192 and to the clutch 199 directly to the gear 197 to give a relatively high rate of rotation to this gear 197. The other range of drive of relatively lower ratio comprises a drive to the shaft 185 through its gear 188 fixed thereon the gear 189 the gear 192, the gear 193, 195 through 196 into the gear 197.

The gear 196 in turn is connected to the overload feed clutch gear 200 which is appropriately journaled on a shaft 201 which shaft in turn is rotatably mounted in the knee 2 of the machine. This gear 200 which is really rotatable on the shaft 201 has formed on it clutch teeth 202 which may be engaged normally with the teeth 203 of the sliding clutch sleeve 204 splined in driving relation on the splined portion 205 of the shaft 201 and which member 204 is normally urged with its clutch teeth 203 into engagement with the clutch teeth 202 by a yielding pressure spring 206 which normally keeps these clutch teeth 202 and 203 into driving relation with each other providing no excessive load or obstruction to the rotation of the shaft 201 is caused by the meeting of the knee, saddle, or table with an obstruction, so as to prevent damage to the feeding mechanism due to excessive overloading. The clutch sleeve 204 is also moved automatically into or out of engagement with the gear 200 when the tool spindle control levers 77 or 88 are effectively moved to engage or disengage the main drive clutch and brake mechanism 24 for the purpose of automatically stopping the feed when the tool spindle rotation is stopped and to permit reengagement of these feeds for all of the knee, saddle, and table feed mechanism when the combined brake and clutch device is operated to reengage rotation of the tool spindle. This mechanism comprises the shifter yoke 207 which engages in the annular slot 208 of the spool 204 and which yoke is carried on the shifter rod 209 slidably mounted in the knee 2. On its rearward end, Figure XI is an appropriate abutment screw 210 which engages a lever 211 pivotally mounted on a suitable pin 212 in the knee 2 and which lever extends beyond the abutment screw 210 to be engaged by a plunger 213 slidably mounted in the knee 2, and which plunger has an appropriate roller 214 which engages a walking beam 215, Figure VIII, which beam is pivotally mounted on suitable pins 216 and 217 on appropriate levers 218 and 219 pivotally mounted on pins 220 and 221 carried in the column 1 of the machine. Noting Figure VI, the lever 218 is also connected for pivotal motion with a lever 222 connected by a suitable link 223 and pin 224 with a lever 225 connected to the rock shaft 84 of the lever 88, so that as the lever 88 moves the linkage 82 already described connected to the lever 77 the clutch spool 204 may thus be actuated in relation to the position of the tool spindle control levers 77 and 88.

Feed driving power is transmitted from the shaft 201 through the rollers 226 of the overrunning clutch device 227 to the gear 228, which gear in turn is connected in driving relation with an idler gear 229 journaled on a shaft 230 fixed in the knee 2, which gear 229 simultaneously engages gears 231 and 232 respectively journaled on the shafts 233 and 234 each rotatably mounted in the knee 2. The gear 232 is fixed on the shaft 234 as is also a second gear 235 fixed on this shaft 234 which gear 235 engages a gear 236 journaled on the shaft 233. Thus, in this arrangement the gear 231 will be driven in one direction directly from the gear 229 whereas the gear 236 will be driven in the opposite direction through the gear 232 shaft 234 and gear 235.

A suitable reversing clutch comprising the clutch spool 237 appropriately mounted on the splined portion 233a of the shaft 233 has clutch teeth 238 arranged to engage clutch teeth 239 on the gear 236 and has clutch teeth 240 arranged to engage clutch teeth 241 on the gear 231. The clutch spool is slidably mounted on the splined portion 233a to effect alternate engagement of the clutch teeth 238 and 239 or clutch teeth 240 and 241, in this way effecting reversal of the drive to the shaft 233 from feed driving power transmitted from the gear 229 as described. Suitable spring cushion means 242 is provided in each of the gears 231 and 236 to effect easy and smooth engagement of the clutch teeth by the spool 237. In this way above described, the shaft 233 may be rotated at a plurality of twenty four different feeding speeds by the various gear trains described and also be actuated at these twenty four different speeds in either direction by manipulation of the clutch spool 237 as described.

The rapid traverse power is also applied to the shaft 233 in both directions as follows: On the shaft 163 is fixed a clutch member 243 which has a suitable multiple disc clutch 244 which may be alternately connected or disconnected to the shaft 163 by manipulation of the spool 245 whereupon the gear 246 connected to the multiple disc clutch arrangement may be rendered connected or disconnected to the power input from the shaft 163. The gear 246 is in driving engagement with the gear 232 so that power connected to the multiple disc clutch 244 from the shaft 163 is transmitted at one time through the gears 246— 232—229—231 or from the gears 246 and 232, shaft 234, gear 235 and gear 236, and by appropriately manipulating the clutch spool 237 may effect connecting of either of the gears 231 or 236 to the shaft 233 for applying rapid traverse power from the shaft 163 to the shaft 233. It will also be noted that the clutch 244 may be engaged at any time during the feeding operation as the actuation of the shaft 234 and the respective associated gears 231 and 236 and rapid traverse speed and the idler gear 229 connected to the gears 231 and 232 at the rapid accelerated rate will not effect the input feeding power from the shaft 201 since the over running clutch provides this increase in rotation of the shaft 233 without effecting the feed input drive. Likewise, as soon as the rapid traverse is disengaged by disengaging the clutch 244 the feed shaft 201 will again immediately pick up and continue the relative feeding motion to the shaft 233. It will also be noted that since the shaft 163 is at all times rotating constantly by the main drive motor 13 that the rapid traverse clutch 244 may be operated to at any time effect the rapid traverse drive to the shaft 233.

The clutch spool 237 for effecting rotation of the shaft 233 in either direction at feeding speed and the clutch spool 245 of the rapid traverse multiple disc clutch 244 are operated in sequential movement by control apparatus to be described later so as to effect feed in either direction or rapid traverse in either direction for the shaft 233.

The driving power from the combined feed and rapid traverse reversing transmission as shown generally in Figure XII, is transmitted to the knee, saddle, and table of the milling machine through the medium of the gear 247 fixed on the shaft 233 which is in driving engagement with the gear 248 journaled on a suitable stud shaft 249 fixed in the knee 2 of the machine. The gear 248 in turn is alternately connectable or disconnectable to the sliding shifting gear 250 on the splined portion 250a of the elevating shaft 251 appropriately journaled in the knee of the machine and which shaft 251 extends rearwardly and has fixed on its inner portion a spiral gear 252 referring particularly to Figures XI, XIII, XVII, which engages a mating spiral gear 253 fixed on the elevating screw 254 which operates in the elevating nut 255 fixed to the support 256 mounted on the surface 257 of the column 1 of the machine by suitable screws 258 so that rotation of the shaft 251 effects rotation of the elevating screw 254 to effect up and down movement of the knee 2 on the slide ways 3 on the column 1 of the milling machine. Also associated with the shaft 251 is an angular bevel gear 259 which is engaged by mating bevel gear 260 on the operating shaft 261 by which a suitable manipulating handle may be applied at 262 to effect manual operation of this shaft for lowering and raising the knee 2, from the side of the knee.

The elevation of the knee may also be effected from the front of the knee by manipulating the crank handle 263 mounted on the shaft 264, Figure XIII, which projects into the knee and has fixed on it a gear 265 which is engaged by the gear 250 when it is shifted on the splined portion 250a of the shaft 251 out of engagement with the gear 248 and into engagement with the gear 265, so that at no time can the power from the gear 248 be applied to the shaft 251 when the manual crank handle 263 on the shaft 264 would be connected thereto thus preventing the rapid rotation of the lever 263 in the event rapid rotation were applied to raising and lowering the knee, which rapid rotation of the crank handle might effect serious damage and injury to the operator.

Power for actuating the saddle for in and out movement is effected by the gear 248 driving the gear 266 which is journaled on the projection 267 of the bracket 268 appropriately fixed in the knee 2. Associated with this gear is a series of clutch teeth 269 which are arranged to be engaged by mating teeth 270 on the clutch spool 271 slidably mounted on the splined portion 272 of the cross feed screw 273 which operates in a nut 274 fixed to the depending bracket 275 fixed to the underside of the saddle 4.

In this way by engaging the clutch teeth 269 and 270 by moving the clutch spool 271 on the splined portion 272 the cross feed screw 273 may be actuated from the gear 248 for feed or rapid traverse movement to the saddle in either direction. Disconnection of the clutch teeth 269 and 270 of course, disconnects the power actuation of the cross feed screw 273 which still may be at all times actuated manually through the medium of the hand wheel 276. Appropriate indicating dials 277 and 278 respectively on the shaft 251 and the cross feed screw 273 each indicates the extent of movement of the knee and saddle.

Power for actuating the work table 6 in feed and rapid traverse motions in either direction is derived from the gear 248 through the gear 266 which latter gear is in engagement with a gear 279 fixed on a shaft 280 journaled against axial movement in the knee 2 and having a splined rearward portion 281 which drivingly operates in a bevel pinion 282 journaled against axial movement in the bracket 275 fixed on the saddle 4, so that the gear 282 may be at all times driven from the shaft 280 for any position of relative movement of the saddle 4 on the knee 2. This bevel gear 282 in turn drives a bevel gear 283 which is connected to a second bevel gear 284 journaled in the saddle and which bevel gears 283 and 284 have a driving clutch arrangement 285 to permit disengagement of the bracket 275 from the bottom of the saddle 4 to facilitate assembly and disassembly operation.

The bevel gear 284 in turn drives a bevel gear 286 which is journaled against axial movement in a projecting boss 287 formed in the saddle 4 and through which bevel gear 286 is provided a suitable splined bore in which operates the splined drive shaft 288 as best seen in Figure XVIII.

This splined drive shaft 288 in turn is journaled against axial movement in the work table 6 and arranged parallel to it is the rotatable feed screw 289 also appropriately journaled in the table 6 against axial movement therein. The screw 289 may be actuated manually by suitable hand wheels 290 and 291 and a suitable indicating dial 292 indicates the extent of relative movement of the work table 6. On this feed screw 289 is fixed the driving pinion 293 which may be engaged with or disengaged from the splined gear 294 fixed in driving relation on the splined portion 295 of the splined drive shaft 288. In this way, feeding power may be connected or disconnected to the screw 289 for actuating the work table by engaging or disengaging the gear 294 with the gear 293 of the screw 289.

*Work feed transmission control*

The twelve primary feed changes for the work table, saddle, and knee as effected by the sequential movements of the dive key actuating spools 178 and 187, Figure XII, is accomplished by means of the speed change control lever 296 which is connected to a rocking segmental block 297, Figure XVI, carried on a pivot pin 298 in the dial drum 299 which in turn is rigidly secured to a disc 300, fixed to the rocking and axially slidable shifting shaft 301. This shaft 301 is slidably mounted in a bushing 302 and keyed therein so as to cause the bushing 302 to rotate with it. The shaft 301 is journaled at its outer end in a suitable bearing 303 in the knee 2. The lower portion of the block 297 is connected by a link 304 with the bushing 302 so that as the lever 296 is moved to the various positions 296a, 296b, or 296c the shaft 301 will likewise slide axially to the three respective positions. The bushing 302 is free to rotate in a suitable bore 305 in the bracket 306 fixed to the knee 2 of the machine while at the same time is free to rotate in this bore 305 without axial movement therein.

On the shaft 301 are a pair of spaced collars 307, Figures XVI and XI, between which operates an arm 308 of a bell crank lever 309 carried on a suitable pivot pin 310 fixed in the knee 2. The other arm of the bell crank 309 has a pin 311 which engages in a slot 312, Figure XII, of a shifter yoke 313 slidably mounted on the shaft 230 in the knee and which shifter yoke has an arm 314 which engages in the annular groove 315 in the dive key actuating spool 187 to effect movement of the dive key 186 to the three positions corresponding to the gear engagement 179—182, 180—183 and 181—184 interconnecting the shafts 175 and 185.

The lever 296 also is adapted to effecting the four speed changes brought about by appropriately moving the dive key actuating spool 178. This is accomplished by swinging the lever around the axis of the shaft 301 to the various positions 296d, e, f, and g, as best shown in Figure VIII. Thus rotating the lever 296 rotates the gear 316 formed on the shaft 301 and actuates the rack 317 formed on the shifter rod 318 slidably mounted in the knee 2. Fixed on this shifter rod 318 is a suitable shifter yoke 319, Figure XV, which operates in the annular groove 320 of the dive key spool 178, so as to cause this spool 178 to be shifted to the four positions for actuating the dive key 176 corresponding to the gear engaged positions 167—171, 168—172, 169—173, and 170—174. Thus by means of this single lever 296 twelve feed ranges may be selected for the work table, saddle and knee by swinging the lever from right to left as shown in Figure VIII or in pulling the lever in and out as shown in Figure XVI.

The selection of the two major ranges of work feed as effected by the movement of the gear 197, Figure XII, is accomplished by means of the lever 321 located directly below the lever 296 and as shown in Figure VIII. This lever 321 is carried on a rock shaft 322 appropriately journaled in the bracket 306 on the knee 2 and has a pinion 323 fixed to it, which operates a segmental gear 324 fixed to the rock shaft 325 appropriately journaled in the knee 2, and upon which rock shaft 325 is fixed the shifter yoke 326 having an appropriate pin 327 which operates in the annular groove 328 of the gear 197, so that as the lever 321 is moved to either of the positions 321a or 321b the gear 197 will likewise be slid on a splined portion 198 of the shaft 191 to effect the two major feed changes between the shafts 185 and 201 as described.

A suitable detent 329 carried in the bushing 302 and operating in appropriate notches 330 in the shaft 301 serves to position the lever 296 in any of the three selected positions 296a, b, or c. A detent 331 carried in the shifter yoke 313 and operating in appropriate detent notches in the shaft 230 serves to position the handle in the four positions 296d, e, f, and g.

In order to facilitate the selection of work feed by means of the levers 296 and 321, dial indicating mechanism is provided in conjunction with these levers. This dial indicating mechanism is best shown in detail in Figure XXI and comprises an indicating dial 332 fixed on the periphery 299a of the member 299. Figure XVI, to which the lever 296 is pivotally mounted. Thus, the dial 332 has rotational movement due to the rocking of the shaft 301 to the four positions 296d, e, f, and g, and has in and out motion to the various positions 296a, b, and c.

Associated with the dial 332 are a pair of indicating pointers 333 of identical construction which are each formed on an angular ring 334 journaled appropriately in the bracket 306 and having gear teeth 335 formed on its periphery which are engaged by the pinion 323 fixed on the rock shaft 322 to which is connected the lever 321. So that rotation of the lever 321 to either of its positions 321a or 321b, Figure VIII, will cause a shift in the indicating pointer 333 from the position 333a to position 333b, indicating the two selections of ranges of feeds to be obtained from the feed transmission in the knee. There are two of such indicating pointers 333 provided and identical areas of notations on the index dial 332 so as to provide easy observation of the feed dial from either the front of the work table or the rear of the work table when operating the milling machine. Both sets of data as disclosed by each of the indicating pointers 333 are identical and take place simultaneously. In addition to this shifting movement of the indicating pointer 333 from position 333a to 333b the dial also moves in and out to the various positions 332a, b, and c, due to the in and out movement of the lever 296 as described. In this way, the appropriate number on the index dial is framed by the notch 336 formed in each of the indicating pointers 333 and in order to further facilitate the selection of the two main ranges of feed as defined by the position of the handle 321 it is preferable to have the areas 337 colored red and the areas 338 colored green, for immediate differentiation of the two ranges of figures in the rapid selection of the feed changes desired for the knee, saddle, and table.

One of the distinctive features of this milling machine transmission and control arrangement lies in the symmetry with which the control arrangements have been provided for the tool spindle and the work moving devices. It is to be noted that the single lever control 102 corresponds substantially identically in symmetrical and operating relationship to the control lever 296 for the feed mechanism, both of which levers control the primary or fine increments of speed and feed changes respectively. It is also to be noted that in conjunction with these two single lever controls 102 and 296 that there is also provided a range selection lever corresponding to the levers 128 and 321 which likewise function similarly, one for controlling the spindle rotation and the other controlling the work feed speed. Thus, by this design the single lever for the range control functions identical in both cases and thereby provides an operative mechanism which is easily understood and operated with the greatest degree of efficiency and minimum of skill and thought required on the part of the operator in making the various spindle and feed changes on the milling machine.

In connection with each of the knee, saddle, and table is provided an individual motion control lever for connecting or disconnecting the feed and rapid traverse power in either direction for each of said members. In connection with the work table is provided the motion control lever 339 Figures XVII and XVIII, which is mounted on a rock shaft 340 to which is connected a lever arm 341 having a pin 342 operating in an annular groove 343 in the gear 294, whereby this gear may be slid on the splined portion 295 of the shaft 288 into or out of engagement with the gear 293 on the feed screw 289 for the table 6. In this way the table may be rendered operative or inoperative in so far as the feeding and rapid traversing motion in either direction is concerned independent of any motion being effected in the saddle or knee.

Likewise the motion of the saddle is stopped or started through the medium of the control lever 344.

Mounted on the rock shaft 345 journaled in the knee 2 is a shifter lever 346 having a projecting pin 347 operating in a groove 348 in the clutch spool 271 so as to effect engagement or disengagement of the clutch member 269 of the gear 266 with the clutch teeth 270 on the clutch spool 271 mounted on the cross feed screw 273 to in this way connect or disconnect the feed and rapid traverse motion in either direction to the saddle.

In connection with controlling the movement of the knee up and down in feed or rapid traverse a control lever 349, Figure XIII, is provided which is mounted on an appropriate sleeve 350, concentric with the lever 344, and having on its inner end a shifter lever 351 having a pin 352 operating in an annular groove 353 in the shiftable gear 250 to in this way effect disconnecting or connecting of power by engagement or disengagement of the gears 250 and 248 and also for effecting connection of the manual control lever or crank 263 by connecting the gear 250 with the gear 265 as described.

By this arrangement each of the knee, saddle and table may be rendered operative independently of each other for the feed and rapid traverse motions in either direction or if desired all of them could be rendered operative at the same time without damage to the machine. Thus, when the lever 339 is moved from the position 339a to 339b, Figure XVII, the table may be rendered in condition for feeding or rapid traversing; also when the lever 344 is moved from the position 344a to the position 344b the saddle will be put into condition for feeding and rapid traversing motion on the ways 5. Also when the lever 349 is moved from the position 349a to the position 349b the knee will be in condition for raising and lowering by power at feed or rapid traverse rate.

It is to be noted that none of these levers 339, 344, or 349 are effected, by movement of its associated member, except by manual operation, that is, they are not utilized or tripped by the motion of their respective member for arresting the feed motion as this is controlled automatically by an entirely independent mechanism now to be described.

After a motion selecting lever such as the lever 339 on the table 6 is moved to the operative position the feeding and rapid traversing of the table in either direction is controlled by means of the operation of the clutch spool 245 of the rapid traverse clutch 244 and the reversing feed clutch spool 237 in appropriate sequential movement, so as to effect the initial rapid traverse and feed and the reverse rapid traverse of the work table as desired in the usual cutting cycle for the machine. This control apparatus for effecting the feed and rapid traverse motion for each of the members rendered operative comprises the control levers 354 and 355, the lever 354 being located on the front right hand side of the knee, the lever 355 being located to the rear and left hand side of the knee. These two levers are interconnected and have similar motion as follows: The lever 355 is mounted on a rock shaft 356, Figures X and XI, journaled in the knee 2 and upon the inner end of which rock shaft is fixed a spiral gear 357 which meshes with a mating spiral gear 358 fixed on a shaft 359 journaled in the knee 2. On the other end of the shaft 359 from gear 358 is a gear 360 which is engaged by a segmental gear 361 fixed on a rock shaft 362 journaled in the knee 2 and to which is fixed the lever 354, so that rocking of one or the other of these levers effects similar motion in the other lever.

Associated with the shaft 359 is a shaft 363 having a gear 364 in mesh with the gear 360 of the shaft 359, so as to be rocked in actuating motion as effected by the control lever 354 or 355. Also fixed on this shaft 363 is a cam drum 365 having appropriate cam slots 366 and 367 respectively operating the lever arms 368 and 369. The lever 369 is pivotally mounted for free rotation on a rock shaft 370 and extends upwardly and engages the reversing feed clutch spool 237 in its annular groove 370 so as to effect the sliding operation of this clutch for engaging one or the other of its sets of teeth with the corresponding clutch gear 231 and 236, Figure XII. The other lever 368 is fixed on the rock shaft 370 and which rock shaft has on its other end as it extends through the knee 2, a shifter lever 371 having a forked portion 372 appropriately operating in the annular groove 373 of the clutch spool 245 of the rapid traverse multiple disc clutch 244 so that it may operate the rapid traverse clutch.

The cam slots 366 and 367 are so designed that when the levers 354 or 355 are actuated, rotating the cam drum 365 from a neutral position to either of the feed positions F, one or the other of the clutch gears 231 or 236 will be engaged by the clutch spool 237. Further movement of the lever to the rapid traverse position R will cause operation of the clutch 244 at either of these positions R. Thus, it can be seen that by moving the control levers 354 or 355 to the feed positions F one or the other of the clutch gears 231 or 236 will first be engaged to effect the feeding motion in the desired direction, and then by further movement of these levers in the particular direction desired to either of the rapid traverse positions R, rapid traverse motion will be imposed upon the feed motion for effecting the rapid traverse of the work member to be actuated.

In order to automatically hold the lever in neutral or in either of the feed positions a suitable detent cam member 374 is fixed on the shaft 363 and has a neutral detent notch 375 and the two feed position notches 376 in which operates the pin 377 of the pivotal arm 378 carried on a pin 379 in the knee 2 and normally urged against detent cam 374 by a suitable compression spring 380. The straight portion 381 of the detent cam 374 serves to normally automatically urge the lever out of the rapid traverse position when it is relieved from manual operation.

It is to be noted that one of the unique arrangements of this single lever control for feed and rapid traverse in either direction by the levers 354 and 355 is that the lever is arranged to move in the direction of the movement of the member which is being actuated. For example, in Figure VIII considering lever 355 when it is moved upward to feed position F or rapid traverse position R and with the motion control lever 349 in position 349a for operation of the knee that the knee will move upward at feed or rapid traverse rate and likewise when the lever 355 is moved downwardly to the feed position F and rapid traverse position R the knee will automatically move downwardly, so as to prevent error and confusion upon the part of the operator in effecting the movements of the various members of the machine. Likewise, the lever 354 when moved to the feed position F or rapid traverse position R; for example to the right, the table 6 will likewise move to the right at feed and rapid traverse rates and when it is moved to the left the table will move to the left at feed or rapid traverse rates, again greatly assisting the operator in the manipulation of the machine and understanding of the motion of the various members with a minimum of effort and skill upon the part of the operator.

Another important feature in connection with this transmission and control mechanism is that in this arrangement rapid traverse may be effected at any time by moving the levers 354 and 355 to either of the rapid traverse positions R whether or not the tool spindle is rotating or not. This is so because the input drive through the shaft 163 is at all times operating independently of the spindle rotation as described in connection with Figure VII. Thus, in setting up the machine the rapid traverse lever may be moved at any time and the proper motion control lever for each of the table, saddle, and knee may be put into effective position for moving any of these elements at any time for setting up the job without having the spindle rotating.

Mechanism is also provided for automatically tripping the levers 354 and 355 out of either of the feed positions into the neutral position at the end of a cutting cycle, so that normally at the end of a cutting cycle these control levers will be tripped into the neutral position and it is merely necessary for the operator to move the handle in the reverse direction to the rapid traverse position to again return the work table to the starting point in the cutting cycle. The mechanism for tripping the feed when the table 6 is operating comprises a pair of plungers 382 and 383 as best shown in Figure XIX, which are slidably mounted in the saddle 4 and which are each arranged to be engaged by dogs 384 and 385 adjustably carried in the suitable T slot 386 in the work table 6. Each of these plungers 382 and 383 engage each side of a pinion 387 carried on a rock shaft 388 Figure XVIII, journaled in the saddle 4 and on the inner end of which rock shaft is provided a segmental gear 389 which operates in an appropriate rack cut in the vertically slidable rod 390 Figure IX. The lower end of the rod 390 is provided with another rack which appropriately operates in the elongated gear 391 formed on the shaft 392 on the front end of which is fixed the segmental gear 393 which in turn engages in the gear 360 so that as one or the other of the plungers 382 or 383 are actuated by the movement of the table 6 the gear 360 will be likewise reciprocated and thereby rotate the control cam drum 365 to normally move the feed reversing clutch sleeve 237, Figure XII, to neutral position with the pin 377 of the detent lever 378 engaging in the detent notch 375 in the cam 374.

The feeding motion of the saddle 4, may also be utilized to automatically trip the control levers 354 and 355 to neutral position at the end of their feeding cycle by means of appropriate dogs 394 and 395, Figure VIII, fixed on the underside of the saddle 4, which engage the trip lever 396 carried on a suitable rock shaft 397 and upon which rock shaft is fixed a lever arm 398 which through the linkage 399 and the lever 400 on the rock shaft 356 of the lever 355 effects the tripping of these levers 355 and 354 to the neutral position from either of the feed positions F.

Also the vertical movement of the knee 2 may also trip the control levers 354 and 355 through the medium of the dogs 401 and 402 appropriately fixed on the column 1 of the milling machine which engages the trip lever 403 on the rock shaft 404 journaled in the knee 2 and having a lever arm 405 which is connected to suitable linkage 406 with a lever 407 on the rock shaft 356 so that again these levers 354 and 355 may be shifted to neutral position from the feed positions F by the movement of the knee 2.

Having thus fully set forth and described our invention what we claim as new and desire to secure by United States Letters Patent is:

1. In a milling machine, a column, a tool spindle rotatably journaled in said column, a main drive motor mounted in said column, a change speed gear transmission mounted in said column, a combined clutch and brake device interconnecting said transmission with said main drive motor for connecting or disconnecting said motor relative to said transmission, a gear drive transmission connecting said change speed transmission to said tool spindle, a belt drive transmission connecting said change speed transmission to said tool spindle, means for effecting speed changes in said change speed transmission, and means for alternately rendering said gear drive or said belt drive transmission effective for connecting power from said main drive motor through said change speed transmission to said tool spindle, said mechanism for rendering said transmission operative comprising a single lever operated control mechanism for effecting all of the speed changes for said change speed transmission, and a lever operated range control mechanism, operatively inter-related to said first mentioned single lever operated control mechanism for rendering said gear or belt drive transmission operative to rotate said tool spindle.

2. In a milling machine, a column, a tool spindle rotatably journaled in said column, a main drive motor mounted in said column, a change speed gear transmission mounted in said column, a combined clutch and brake device interconnecting said transmission with said main drive motor for connecting or disconnecting said motor relative to said transmission, a gear drive transmission connecting said change speed transmission to said tool spindle, a belt drive transmission connecting said change speed transmission to said tool spindle, means for effecting speed changes in said change speed transmission, and means for alternately rendering said gear drive or said belt drive transmission effective for connecting power from said main drive motor through said change speed transmission to said tool spindle, said mechanism for rendering said transmission operative comprising a single control lever having swinging and in and out motion adapted to select all of the speed ranges of said change speed transmission, a single lever range control lever associated with said first mentioned lever for actuating said change speed transmission, and inter-related dial indicating mechanism operable by the movement of said range selection lever and said feed selection lever for indicating positions of selected speeds for said first mentioned single control lever for said change speed transmission.

3. In a milling machine, a column, a tool spindle rotatably journaled in said column, a main drive motor mounted in said column, a change speed gear transmission mounted in said column, a combined clutch and brake device interconnecting said transmission with said main drive motor for connecting or disconnecting said motor relative to said transmission, a gear drive transmission connecting said change speed transmission to said tool spindle, a belt drive transmission connecting said change speed transmission to said tool spindle, means for effecting speed changes in said change speed transmission, and means for alternately rendering said gear drive or said belt drive transmission effective for connecting power from said main drive motor through said change speed transmission to said tool spindle, said actuating mechanism for rendering said transmissions operative including a single control lever, having swinging positions and in and out positions, mounted on the column of said milling machine and arranged to render said actuating mechanism operable to effect all of the speed changes in said change speed transmission, a range selection lever mounted on said column below said first mentioned single control lever for alternately rendering said gear drive or belt drive transmission to said tool spindle operative, and dial indicating mechanism operable by the movement of both of said levers for indicating any of said feeds and ranges selected.

4. In a milling machine, a column, a tool spindle rotatably journaled in said column, a main drive motor mounted in said column, a change speed gear transmission mounted in said column, a combined clutch and brake device interconnecting said transmission with said main drive motor for connecting or disconnecting said motor relative to said transmission a gear drive transmission connecting said change speed transmission to said tool spindle, a belt drive transmission connecting said change speed transmission to said tool spindle, means for effecting speed changes in said change speed transmission, and means for alternately rendering said gear drive or said belt drive transmission effective for connecting power from said main drive motor through said change speed transmission to said tool spindle, said actuating mechanism for rendering said transmissions operative including a single control lever, having swinging positions and in and out positions, mounted on the column of said milling machine and arranged to render said actuating mechanism operable to effect all of the speed changes in said change speed transmission, a range selection lever mounted on said column below said first mentioned single control lever for alternately rendering said gear drive or belt drive transmission to said tool spindle operative, and dial indicating means associated with said first mentioned lever and movable therewith, an indicating pointer associated with said dial indicating means of first mentioned lever and movable by the relative movement of said range control lever, and means on said indicating device for framing the particular speed on said dial obtained by said first mentioned lever relative to the position of said second mentioned range selection lever.

5. In a milling machine, a column, a tool spindle rotatably mounted in said column, a change speed transmission in said column, means for connecting said transmission by gearing to said tool spindle, and means for connecting said transmission through belted means to said spindle, means for driving said transmission, a single lever control device for effecting speed changes in said change speed transmission, having swinging motion to a series of speed positions and an in and out motion to an additional series of speed positions, an indicating dial connected to said lever to move therewith to indicate said series of positions, a second lever arranged to effect the gear driving or belt driving connection from said change speed transmission to said tool spindle, and an indicating pointer associated with said dial for indicating speeds marked on said dial, and means interconnecting said second mentioned lever with said pointer so that motion of said second mentioned lever effects a change of position of said indicating pointer for indicating different series of data on said indicating dial.

6. In a milling machine, a column, a tool spindle rotatably mounted in said column, a change speed transmission in said column, means for connecting said transmission by gearing to said tool spindle, and means for connecting said transmission through belted means to said spindle, means for driving said transmission, a single lever control device for effecting speed changes in said change speed transmission, having swinging motion to a series of speed positions and an in and out motion to an additional series of speed positions, an indicating dial connected to said lever to move therewith to indicate said series of positions, a second lever arranged to effect the gear driving or belt driving connection from said change speed transmission to said tool spindle, and an indicating pointer associated with said dial for indicating speeds marked on said dial, and means interconnecting said second mentioned lever with said pointer so that motions of said second mentioned lever effects a change of position of said indicating pointer for indicating different series of data on said indicating dial, means for driving said transmission, and means for connecting and disconnecting said driving means relative to said change speed transmission, a control lever, for operating said last mentioned connecting and disconnecting means, located directly below said single lever control so as to facilitate simultaneous actuation of said connecting and disconnecting means and the manipulation of said change speed levers for said change speed transmission.

RICHARD K. LE BLOND
HARRY C. KEMPER.